United States Patent
Ryu et al.

(10) Patent No.: US 11,985,704 B2
(45) Date of Patent: May 14, 2024

(54) METHOD AND APPARATUS FOR PERFORMING JOINT TRANSMISSION IN WIRELESS LAN SYSTEM

(71) Applicant: LG ELECTRONICS INC., Seoul (KR)

(72) Inventors: Kiseon Ryu, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 394 days.

(21) Appl. No.: 17/414,450

(22) PCT Filed: Jul. 3, 2019

(86) PCT No.: PCT/KR2019/008115
§ 371 (c)(1),
(2) Date: Jun. 16, 2021

(87) PCT Pub. No.: WO2020/166770
PCT Pub. Date: Aug. 20, 2020

(65) Prior Publication Data
US 2022/0104257 A1 Mar. 31, 2022

Related U.S. Application Data

(60) Provisional application No. 62/805,965, filed on Feb. 15, 2019.

(51) Int. Cl.
*H04W 74/08* (2009.01)
*H04L 1/1607* (2023.01)
(Continued)

(52) U.S. Cl.
CPC ....... *H04W 74/0816* (2013.01); *H04L 1/1621* (2013.01); *H04W 72/0446* (2013.01);
(Continued)

(58) Field of Classification Search
None
See application file for complete search history.

(56) References Cited

U.S. PATENT DOCUMENTS

| 10,038,531 B2 | 7/2018 | Seok et al. | |
| 2015/0043493 A1* | 2/2015 | Gajanan | H04W 16/14 370/329 |

(Continued)

FOREIGN PATENT DOCUMENTS

| KR | 1020150082558 | 7/2015 |
| WO | 1020150082558 | 7/2015 |

OTHER PUBLICATIONS

LG Electronics, Consideration on multi-AP coordination for EHT, IEEE 802.11-18/1982rl, Jan. 14, 2019, see slides 2-3.
(Continued)

*Primary Examiner* — Phirin Sam
(74) *Attorney, Agent, or Firm* — BRYAN CAVE LEIGHTON PAISNER LLP

(57) ABSTRACT

Proposed are a method and apparatus for performing joint transmission in a wireless LAN system. Specifically, an M-AP transmits a C-RTS frame to first and second S-APs. The M-AP receives, from the first and second S-APs, a CTS frame that is a response to the C-RTS frame. The M-AP performs joint transmission on an STA through the first and second S-APs.

13 Claims, 28 Drawing Sheets

(51) Int. Cl.
*H04W 72/0446* (2023.01)
*H04W 72/0453* (2023.01)
*H04W 74/0816* (2024.01)
*H04W 84/12* (2009.01)

(52) U.S. Cl.
CPC .... *H04W 74/0866* (2013.01); *H04W 72/0453* (2013.01); *H04W 84/12* (2013.01)

(56) References Cited

U.S. PATENT DOCUMENTS

| | | | | |
|---|---|---|---|---|
| 2015/0172012 | A1* | 6/2015 | Abeysekera | H04L 5/0032 370/329 |
| 2015/0264710 | A1* | 9/2015 | Kneckt | H04W 72/542 370/336 |
| 2015/0312386 | A1* | 10/2015 | Lee | H04L 69/04 370/338 |
| 2018/0146488 | A1* | 5/2018 | Li | H04W 72/1215 |
| 2018/0302858 | A1* | 10/2018 | Son | H04L 65/40 |
| 2018/0376486 | A1* | 12/2018 | Ahn | H04W 74/04 |
| 2019/0025401 | A1 | 1/2019 | Vazhenin et al. | |
| 2019/0253963 | A1* | 8/2019 | Kim | H04W 84/12 |
| 2021/0385779 | A1* | 12/2021 | Oteri | H04W 60/04 |
| 2023/0216924 | A1* | 7/2023 | Elliott | H02J 13/00024 307/104 |

OTHER PUBLICATIONS

Sony Corporation, Discussion on Multi-AP Coordination Type, IEEE 802.11-19/0104rl, Jan. 17, 2019, see slides 2-11.

* cited by examiner

FIG. 1
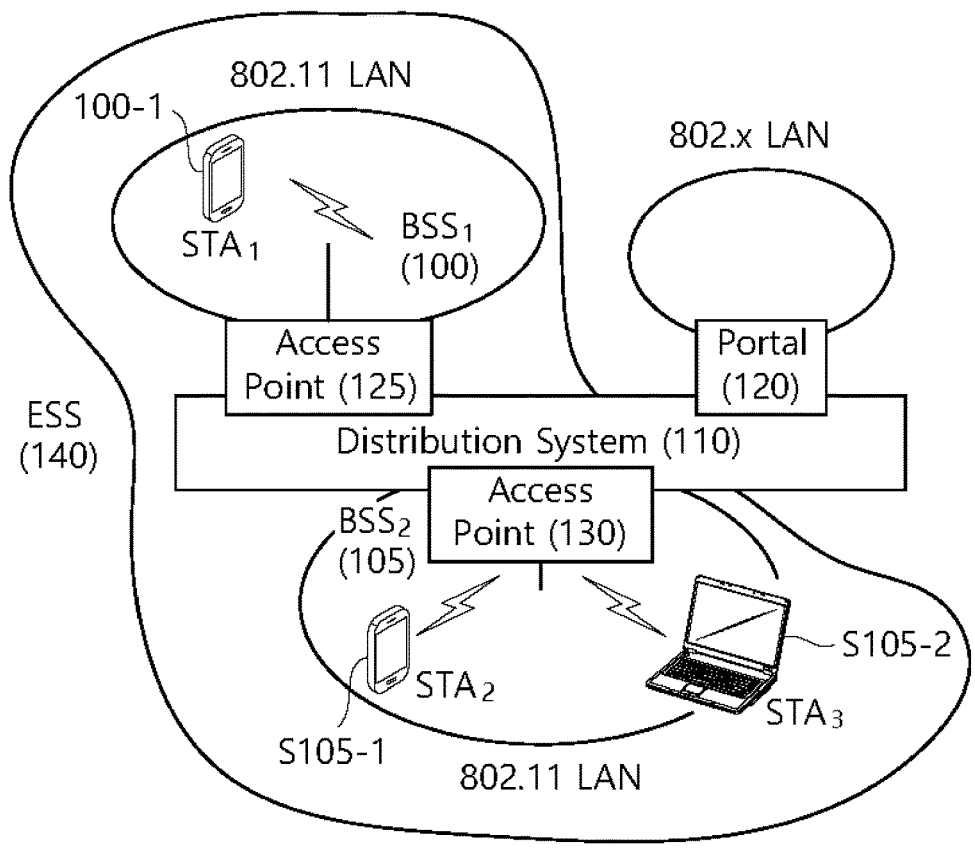
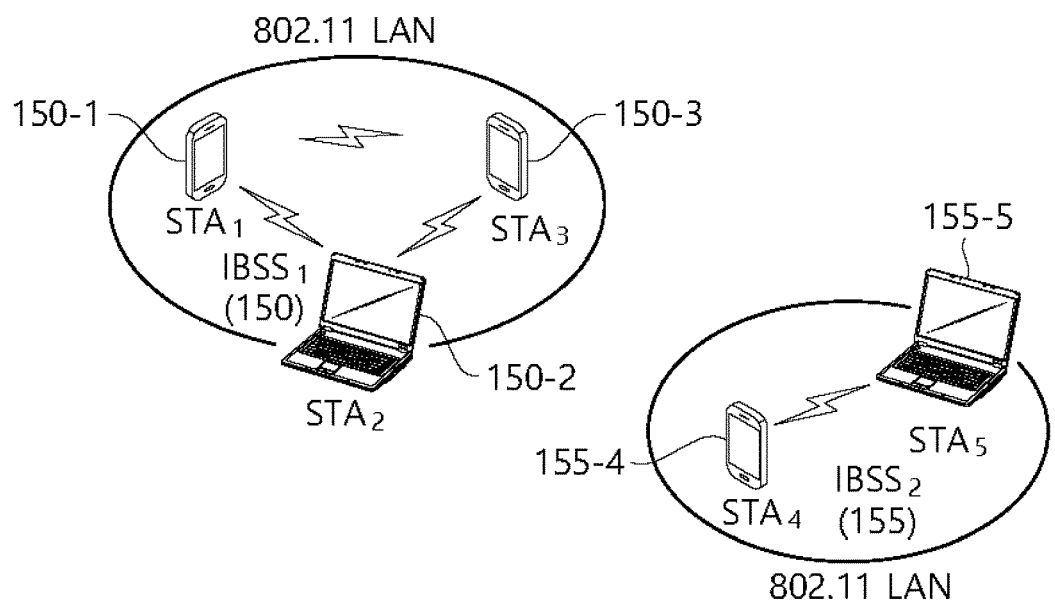

Single STA being served
by multiple APs ation No. PCT/KR2019/008115 filed on Jul. 3, 2019, which claims priority to U.S. Provisional Application No. 62/805,965 filed on Feb. 15, 2019, the contents of which are hereby incorporated by reference herein in their entirety.

BACKGROUND OF THE DISCLOSURE

Field of the Disclosure

The present specification relates to a method for performing joint transmission in a wireless LAN (WLAN) system and, most particularly, to a method and device for transmitting a joint frame, by multiple access points (APs), in a WLAN system.

Related Art

Discussion for a next-generation wireless local area network (WLAN) is in progress. In the next-generation WLAN, an object is to 1) improve an institute of electronic and electronics engineers (IEEE) 802.11 physical (PHY) layer and a medium access control (MAC) layer in bands of 2.4 GHz and 5 GHz, 2) increase spectrum efficiency and area throughput, 3) improve performance in actual indoor and outdoor environments such as an environment in which an interference source exists, a dense heterogeneous network environment, and an environment in which a high user load exists, and the like.

An environment which is primarily considered in the next-generation WLAN is a dense environment in which access points (APs) and stations (STAs) are a lot and under the dense environment, improvement of the spectrum efficiency and the area throughput is discussed. Further, in the next-generation WLAN, in addition to the indoor environment, in the outdoor environment which is not considerably considered in the existing WLAN, substantial performance improvement is concerned.

In detail, scenarios such as wireless office, smart home, stadium, Hotspot, and building/apartment are largely concerned in the next-generation WLAN and discussion about improvement of system performance in a dense environment in which the APs and the STAs are a lot is performed based on the corresponding scenarios.

In the next-generation WLAN, improvement of system performance in an overlapping basic service set (OBSS) environment and improvement of outdoor environment performance, and cellular offloading are anticipated to be actively discussed rather than improvement of single link performance in one basic service set (BSS). Directionality of the next-generation means that the next-generation WLAN gradually has a technical scope similar to mobile communication. When a situation is considered, in which the mobile communication and the WLAN technology have been discussed in a small cell and a direct-to-direct (D2D) communication area in recent years, technical and business convergence of the next-generation WLAN and the mobile communication is predicted to be further active.

SUMMARY OF THE DISCLOSURE

Technical Objects

The present specification proposed a method and device for performing a joint frame transmission in a wireless LAN (WLAN) system.

Technical Solutions

An example of the present specification proposes a method for performing a joint frame transmission.

This embodiment may be performed in a network environment being supported by a next generation wireless LAN system. The next generation wireless LAN system is an enhanced (or evolved) version of the 802.11ax system, which can satisfy backward compatibility with the 802.11ax system.

The present embodiment is performed by a Master-Access Point (M-AP) supporting multiple APs. A receiving device of the present embodiment may correspond to a station (STA) supporting an Extremely High Throughput (EHT) WLAN system.

A Master-Access Point (M-AP) transmits a Coordinated-Request To Send (C-RTS) frame to a first Slave-Access Point (S-AP) and a second S-AP.

The M-AP receives a Clear To Send (CTS) frame, as a response to the C-RTS frame, from the first S-AP and the second S-AP.

The M-AP performs the joint transmission to the station (STA) through the first S-AP and the second S-AP.

The M-AP performs a role of a coordinator coordinating multiple APs (herein, the first S-AP and the second S-AP). Multi-AP coordination may be performed through C-RTS frame and CTS-frame exchange between the M-AP and the first and second S-APs.

The C-RTS frame performs a role of a trigger frame and may be referred to as a Multi-AP (MAP) trigger frame or a Slave trigger frame.

A TXVECTOR parameter SCRAMBLER_INITIAL_VALUE of the CTS frame may be configured to be equal to a RXVECTOR parameter SCRAMBLER_INITIAL_VALUE of the C-RTS frame.

A step of performing, by the M-AP, the joint transmission to the STA through the first and second S-APs may include the following process.

The first S-AP may transmit a first Coordinated-Beamforming (C-BF) frame to the STA. The second S-AP may transmit a second Coordinated-Beamforming (C-BF) frame to the STA.

The first S-AP may receive a first ACK or first Block ACK (BA) on the first C-BF frame. The second S-AP may receive a second ACK or second BA on the second C-BF frame.

The first and second C-BR frames may be transmitted simultaneously. That is, joint transmission may be performed through the first and second C-BR frames. The first and second C-BR frames are frames being transmitted by multiple APs being coordinated and transmitted based on beamforming. The first and second C-BR frames may be replaced with C-OFDMA frames or joint frames, and so on. The C-OFDMA frame is a frame being transmitted by multiple APs being coordinated and transmitted based on OFDMA.

The first and second ACKs may be received simultaneously, and the first and second BAs may be received simultaneously.

A Network Allocation Vector (NAV) may be configured from a first time point to a second time point based on the C-RTS frame. Additionally, a NAV may be configured from a third time point to a fourth time point based on the CTS frame.

The first time point may be a time point at which transmission of the C-RTS frame is ended, and the second time point may be a time point at which transmission of the first ACK or the first BA is ended. The third time point may be a time point at which transmission of the CTS frame is ended, and the fourth time point may be a time point at which transmission of the second ACK or the second BA is ended.

In case the STA includes a first STA and a second STA, the first C-BF frame may be transmitted to the first STA, the second C-BF frame may be transmitted to the second STA, the first ACK or the first BA may be transmitted by the first STA, and the second ACK or the second BA may be transmitted by the second STA.

The M-AP and the first and second S-APs may be connected through a wireless backhaul.

As another example, the M-AP and the first and second S-APs may be connected through a wired backhaul.

At this point, the first and second S-APs may transmit an unsolicited CTS frame to the M-AP. Therefore, the M-AP does not need to transmit a triggering CTS frame that requests or triggers an unsolicited CTS frame.

A NAV may be configured after having transmitted the unsolicited CTS frame.

After the first and second S-APs have transmitted the CTS frames, the first and second S-APs may transmit a C-BF frame/C-OFDMA frame/joint transmission frame to the STA (joint transmission). The STA may then transmit an ACK or BA for the C-BF frame/C-OFDMA frame/joint transmission frame to the first and second S-APs.

As yet another example, a case where the first and second S-APs transmit a PPDU including a PHY header to the STA may be described.

The PPDU may be configured of a non-beamforming part and a beamforming part. Herein, the non-beamforming part includes a legacy preamble and an EHT-SIG1 field. The EHT-SIG1 field includes a Multi-AP (MAP) common information. The beamforming part includes EHT-STF, EHT-LTF, EHT-SIG2 fields and a PSDU. The EHT-SIG2 field includes user specific information (or User Specific Info).

The non-beamforming part may correspond to a PHY header, and the PHY header includes TXOP information. Accordingly, an AP may configure a NAV after having transmitted the PHY header based on the TXOP information, which is included in the PHY header.

The first and second S-APs may transmit the C-BF frame/C-OFDMA frame/joint transmission frame by including the corresponding frame(s) in the beamforming part (joint transmission). The STA may then transmit an ACK or BA for the C-BF frame/C-OFDMA frame/joint transmission frame to the first and second S-APs.

Effects of the Disclosure

According to an embodiment proposed in the present specification, by configuring a NAV according to a multi-AP coordination scheme, interference from an OBSS STA or an unintended STA may be prevented, and joint transmission may be efficiently performed.

BRIEF DESCRIPTION OF THE DRAWINGS

FIG. 1 is a conceptual view illustrating the structure of a wireless local area network (WLAN).

DESCRIPTION OF EXEMPLARY EMBODIMENTS

Figure 2:
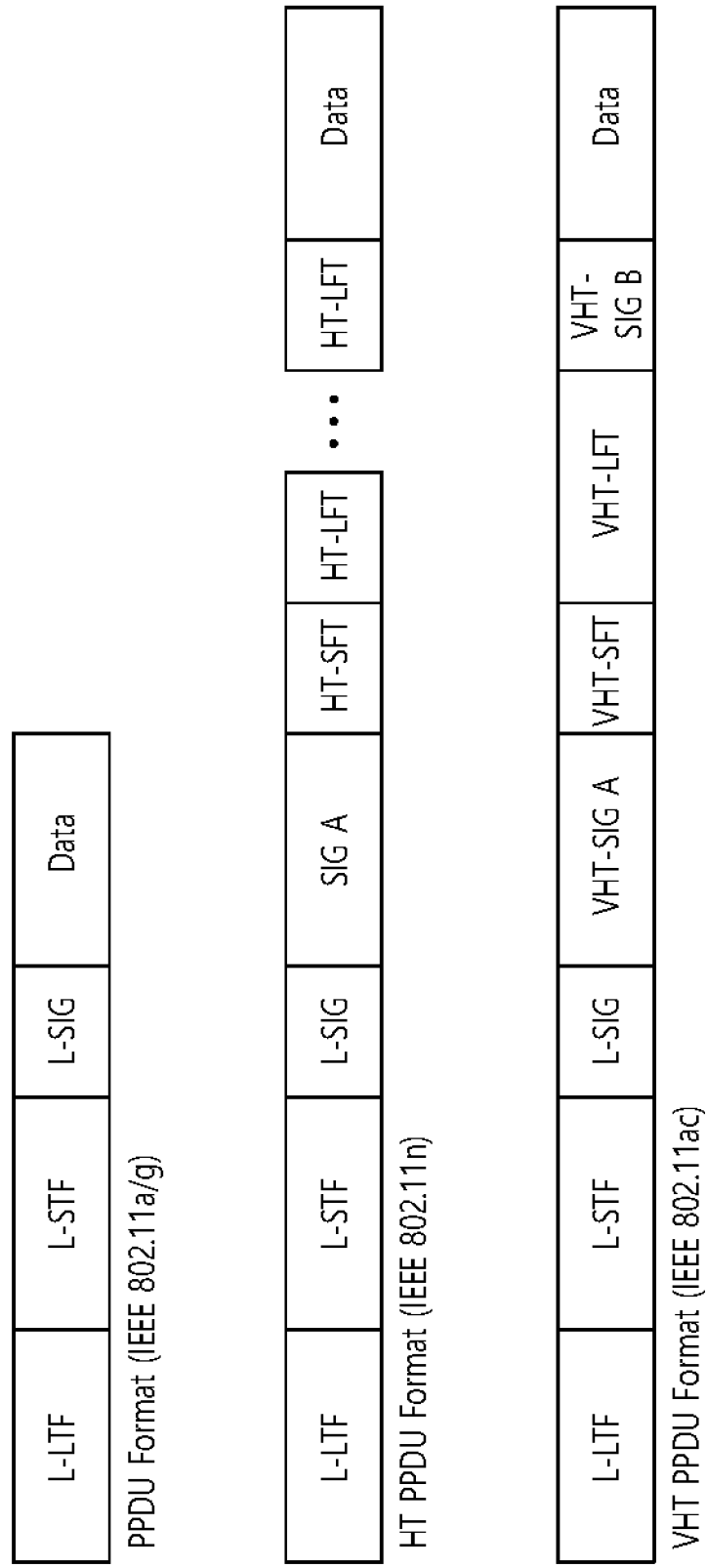
FIG. 2 illustrates an example of a PPDU used in an IEEE standard.

FIG. 1 is a conceptual view illustrating the structure of a wireless local area network (WLAN).

An upper part of FIG. 1 illustrates the structure of an infrastructure basic service set (BSS) of institute of electrical and electronic engineers (IEEE) 802.11.

Referring the upper part of FIG. 1, the wireless LAN system may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region. The BSS 105 may include one or more STAs 105-1 and 105-2 which may be joined to one AP 130.

The BSS may include at least one STA, APs providing a distribution service, and a distribution system (DS) 110 connecting multiple APs.

The distribution system 110 may implement an extended service set (ESS) 140 extended by connecting the multiple BSSs 100 and 105. The ESS 140 may be used as a term indicating one network configured by connecting one or more APs 125 or 230 through the distribution system 110. The AP included in one ESS 140 may have the same service set identification (SSID).

A portal 120 may serve as a bridge which connects the wireless LAN network (IEEE 802.11) and another network (e.g., 802.X).

In the BSS illustrated in the upper part of FIG. 1, a network between the APs 125 and 130 and a network between the APs 125 and 130 and the STAs 100-1, 105-1, and 105-2 may be implemented. However, the network is configured even between the STAs without the APs 125 and 130 to perform communication. A network in which the communication is performed by configuring the network even between the STAs without the APs 125 and 130 is defined as an Ad-Hoc network or an independent basic service set (IBSS).

A lower part of FIG. 1 illustrates a conceptual view illustrating the IBSS.

Referring to the lower part of FIG. 1, the IBSS is a BSS that operates in an Ad-Hoc mode. Since the IBSS does not include the access point (AP), a centralized management entity that performs a management function at the center does not exist. That is, in the IBSS, STAs 150-1, 150-2, 150-3, 155-4, and 155-5 are managed by a distributed manner. In the IBSS, all STAs 150-1, 150-2, 150-3, 155-4, and 155-5 may be constituted by movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

Meanwhile, the term user may be used in various meanings, and for example, may also be used to mean an STA participating in uplink MU MIMO and/or uplink OFDMA transmission in wireless LAN communication, but it is not limited thereto.

FIG. 2 illustrates an example of a PPDU used in an IEEE standard.

As illustrated in FIG. 2, various types of PHY protocol data units (PPDUs) are used in IEEE a/g/n/ac standards. Specifically, a LTF and a STF include a training signal, a SIG-A and a SIG-B include control information for a receiving STA, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
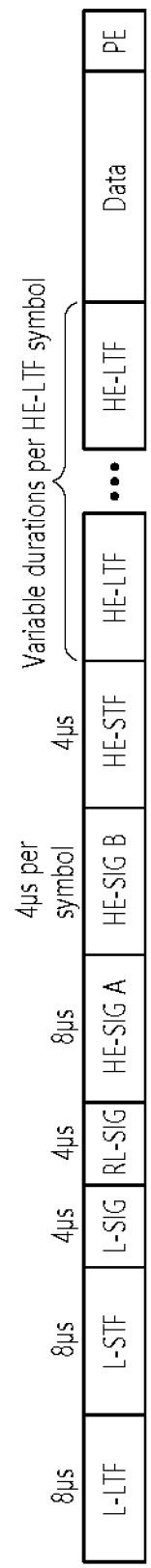
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

A more detailed description of each field of FIG. 3 will be provided later.

Figure 4:
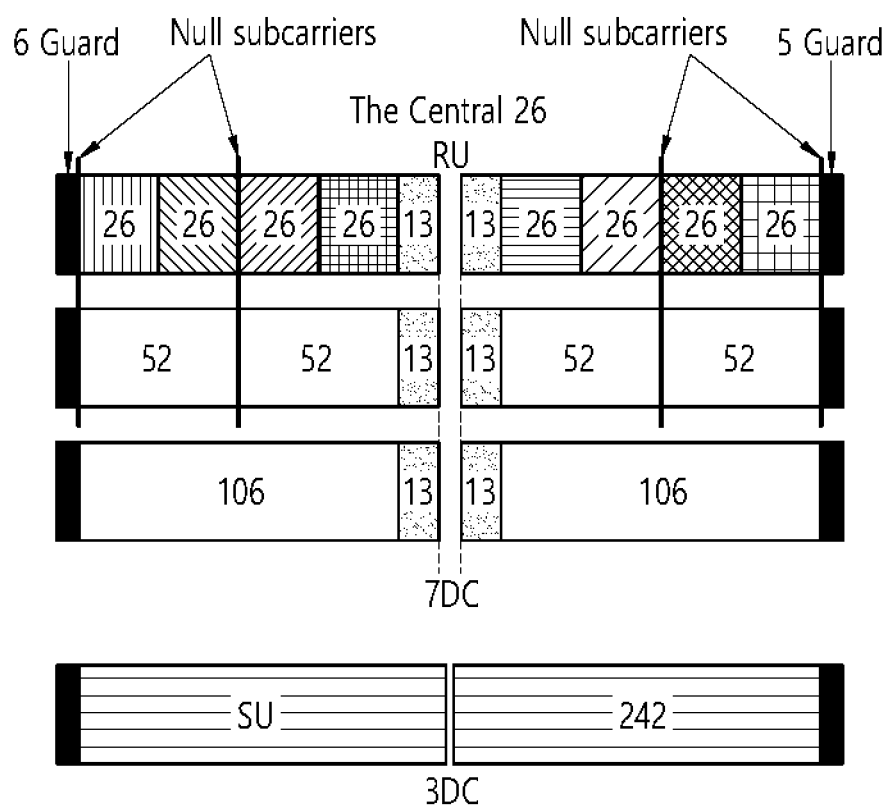
FIG. 4 illustrates a layout of resource units (RUs) used in a band of 20 MHz.

FIG. 4 illustrates a layout of resource units (RUs) used in a band of 20 MHz.

As illustrated in FIG. 4, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 4, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 4 may be used not only for a multiple users (MUs) but also for a single user (SU), in which case one 242-unit may be used and three DC tones may be inserted as illustrated in the lowermost part of FIG. 4.

Although FIG. 4 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 5:
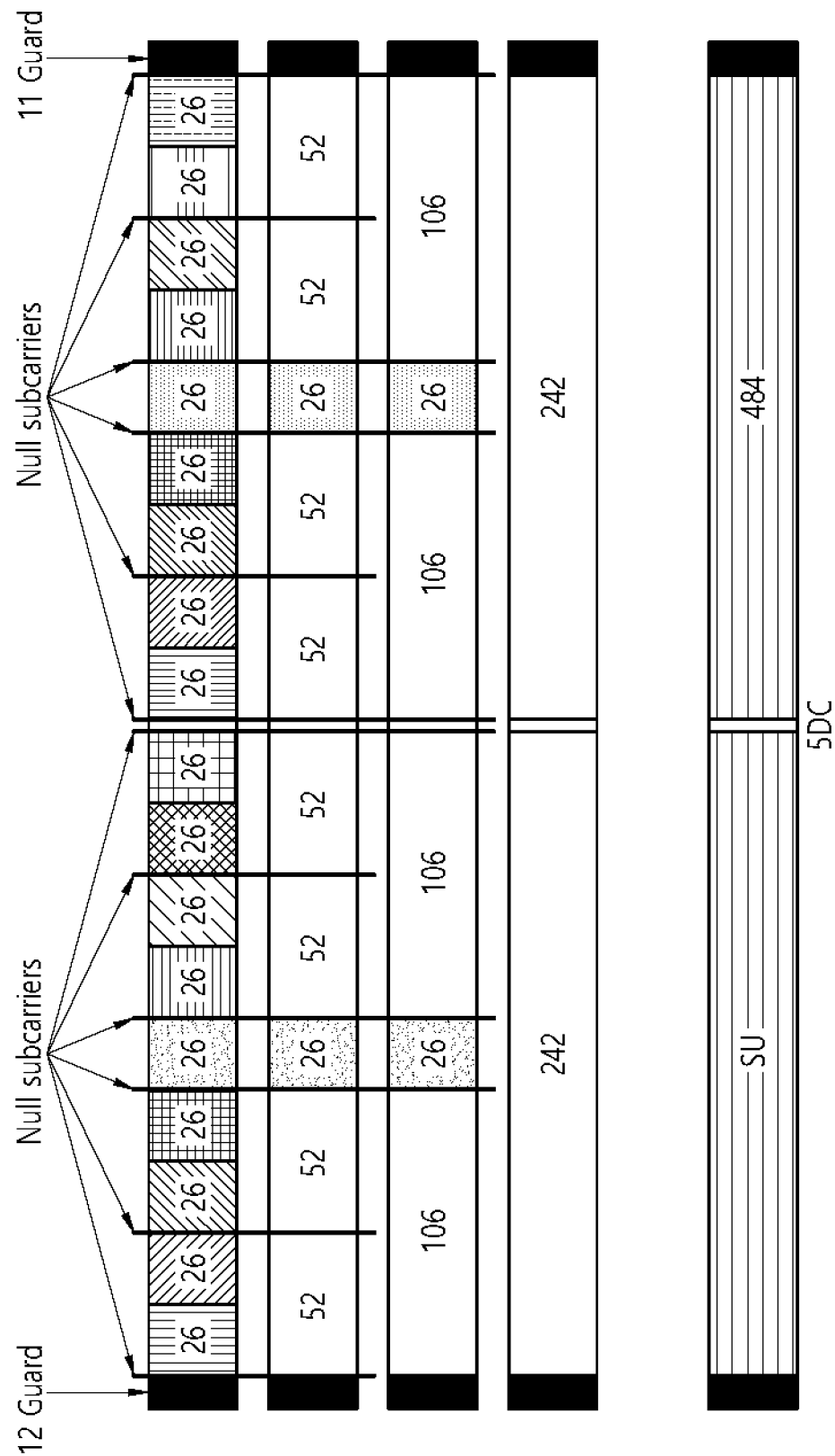
FIG. 5 illustrates a layout of RUs used in a band of 40 MHz.

FIG. 5 illustrates a layout of RUs used in a band of 40 MHz.

Similarly to FIG. 4 in which RUs having various sizes are used, a 26-RU, a 52-RU, a 106-RU, a 242-RU, a 484-RU, and the like may be used in an example of FIG. 5. Further, five DC tones may be inserted in a center frequency, 12 tones may be used for a guard band in the leftmost band of the 40 MHz band, and 11 tones may be used for a guard band in the rightmost band of the 40 MHz band.

Figure 6:
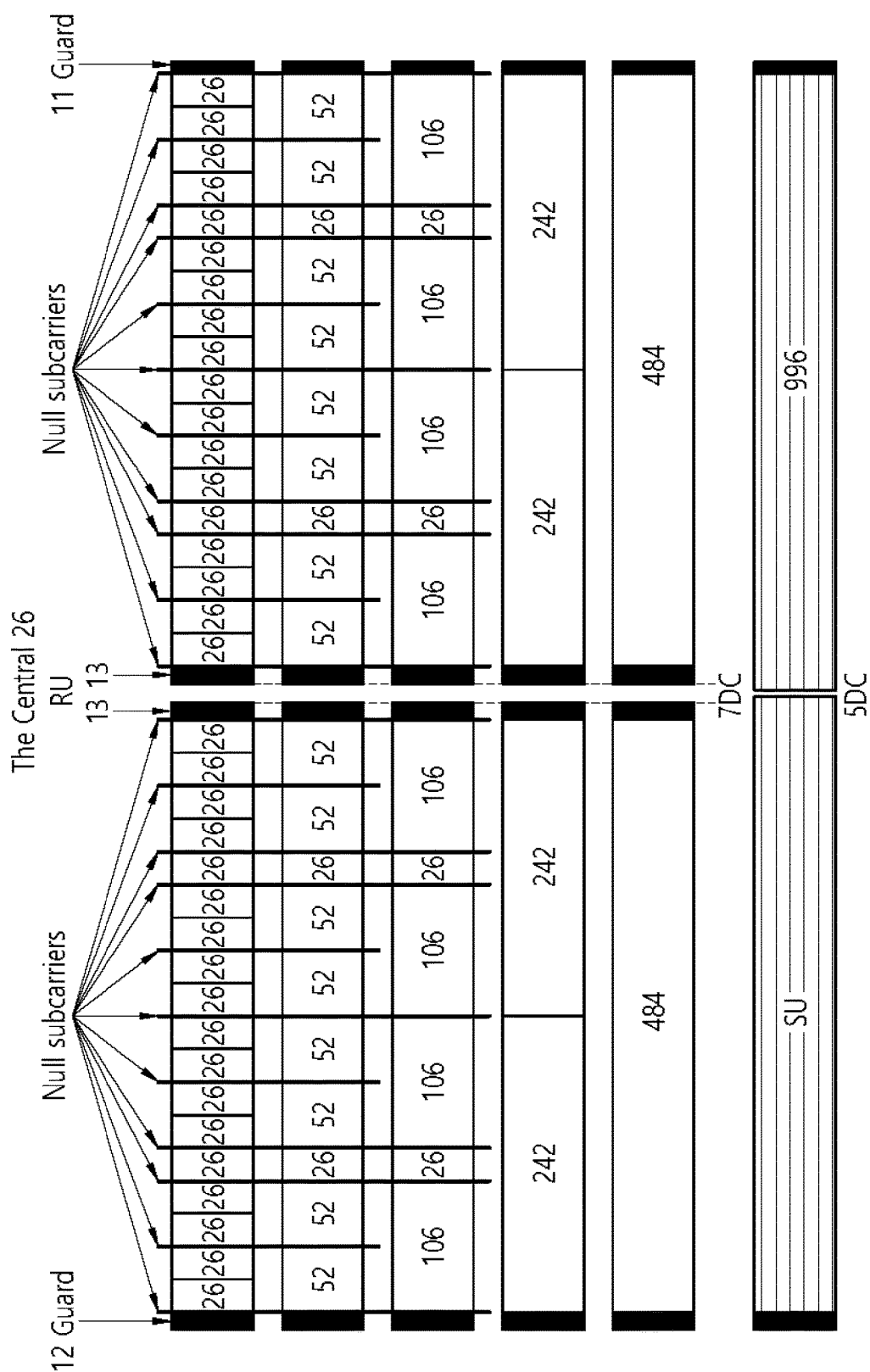
FIG. 6 illustrates a layout of RUs used in a band of 80 MHz.

As illustrated in FIG. 6, when the layout of the RUs is used for a single user, a 484-RU may be used. The specific number of RUs may be changed similarly to FIG. 5.

FIG. 6 illustrates a layout of RUs used in a band of 80 MHz.

Similarly to FIG. 4 and FIG. 5 in which RUs having various sizes are used, a 26-RU, a 52-RU, a 106-RU, a 242-RU, a 484-RU, a 996-RU, and the like may be used in an example of FIG. 6. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated, when the layout of the RUs is used for a single user, a 996-RU may be used, in which case five DC tones may be inserted.

In the meantime, the fact that the specific number of RUs can be changed is the same as those of FIGS. 4 and 5.

Figure 7:
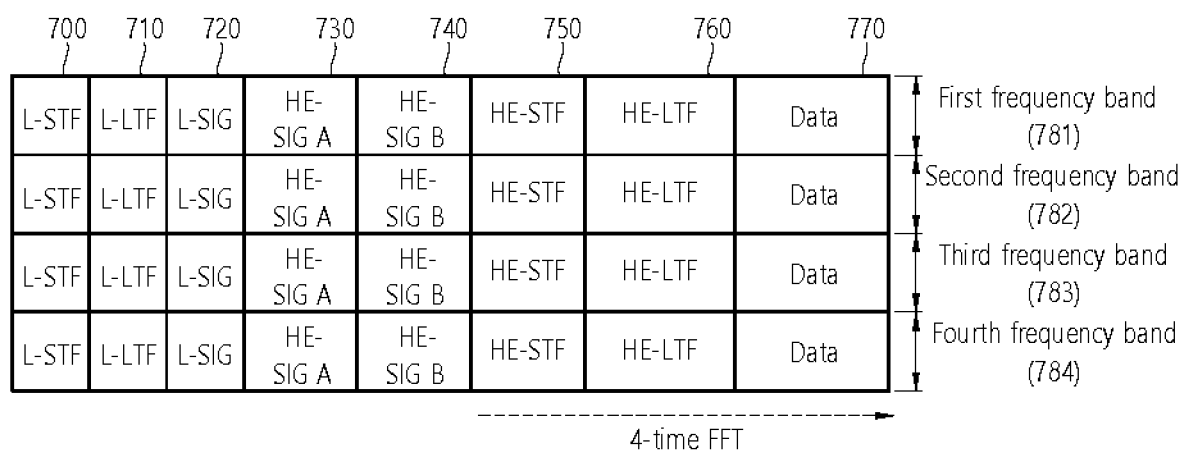
FIG. 7 illustrates another example of an HE PPDU.

FIG. 7 illustrates another example of an HE PPDU.

The illustrated block of FIG. 7 is another example of describing the HE-PPDU block of FIG. 3 in the frequency domain.

An L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information about a data rate and a data length. Further, the L-SIG 720 may be repeatedly transmitted. That is, a format in which the L-SIG 720 is repeated (which may be referred to, for example, as an R-LSIG) may be configured.

An HE-SIG-A 730 may include control information common to a receiving STA.

Specifically, the HE-SIG-A 730 may include information about 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to an HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A specific field of the HE-SIG-A may be added or partially omitted. Further, some fields of the HE-SIG-A may be partially added or omitted in other environments other than a multi-user (MU) environment.

In addition, the HE-SIG-A (730) may be configured of two parts: HE-SIG-A1 and HE-SIG-A2. The HE-SIG-A1 and HE-SIG-A2 included in the HE-SIG-A may be defined by the following format structure (fields) according to the PPDU. Firstly, the HE-SIG-A field of the HE SU PPDU may be defined as follows.

TABLE 1

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU: Set to 1 for an HE SU PPDU and HE ER SU PPDU |
| | B1 | Beam Change | 1 | Set to 1 to indicate that the pre-HE modulated fields of the PPDU are spatially mapped differently from the first symbol of the HE-LTF. Equation (28-6), Equation (28-9), Equation (28-12), Equation (28-14), Equation (28-16) and Equation (28-18) apply if the Beam Change field is set to 1. Set to 0 to indicate that the pre-HE modulated fields of the PPDU are spatially mapped the same way as the first symbol of the HE-LTF on each tone. Equation (28-8), Equation (28-10), Equation (28-13), Equation (28-15), Equation (28-17) and Equation (28-19) apply if the Beam Change field is set to 0.(#16803) |
| | B2 | UL/DL | 1 | Indicates whether the PPDU is sent UL or DL. Set to the value indicated by the TXVECTOR parameter UPLINK_FLAG. |
| | B3-B6 | MCS | 4 | For an HE SU PPDU: Set to n for MCSn, where n = 0, 1, 2, . . . , 11 Values 12-15 are reserved For HE ER SU PPDU with Bandwidth field set to 0 (242-tone RU): Set to n for MCSn, where n = 0, 1, 2 Values 3-15 are reserved For HE ER SU PPDU with Bandwidth field set to 1 (upper frequency 106-tone RU): Set to 0 for MCS 0 Values 1-15 are reserved |

TABLE 1-continued

| Two Parts of HE-SIG-A | Bit | Field | Number of bits | Description |
|---|---|---|---|---|
| | B7 | DCM | 1 | Indicates whether or not DCM is applied to the Data field for the MCS indicated. If the STBC field is 0, then set to 1 to indicate that DCM is applied to the Data field. Neither DCM nor STBC shall be applied if(#15489) both the DCM and STBC are set to 1. Set to 0 to indicate that DCM is not applied to the Data field. NOTE-DCM is applied only to HE-MCSs 0, 1, 3 and 4. DCM is applied only to 1 and 2 spatial streams. DCM is not applied in combination with STBC(#15490). |
| | B8-B13 | BSS Color | 6 | The BSS Color Field is an identifier or the BSS. Set to the value of the TXVECTOR parameter BSS_-COLOR. |
| | B14 | Reserved | 1 | Reserved and set to 1 |
| | B15-B18 | Spatial Reuse | 4 | Indicates whether or not spatial reuse is allowed during the transmission of this PPDU(#16804). Set to a value from Table 28-21 (Spatial Reuse field encoding for an HE SU PPDU, HE ER SU PPDU, and HE MU PPDU), see 27.11.6 (SPATIAL_REUSE). Set to SRP_DISALLOW to prohibit SRP-based spatial reuse during this PPDU. Set to SRP_AND_NON_S-RG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B19-B20 | Bandwidth | 2 | For an HE SU PPDU: Set to 0 for 20 MHz Set to 1 for 40 MHz Set to 2 for 80 MHz Set to 3 for 160 MHz and 80 + 80 MHz For an HE ER SU PPDU: Set to 0 for 242-tone RU Set to 1 for upper frequency 106-tone RU within the primary 20 MHz Values 2 and 3 are reserved |
| | B21-B22 | GI + LTF Size | 2 | Indicates the GI duration and HE-LTE size. Set to 0 to indicate a 1x HE-LTF and 0.8 μs GI Set to 1 to indicate a 2x HE-LTF and 0.8 μs GI Set to 2 to indicate a 2x HE-LTF and 1.6 μs GI Set to 3 to indicate: a 4x HE-LTF and 0.8 μs GI if both the DCM and STBC fields are 1. Neither DCM nor STBC shall be applied if (#Ed) both the DCM and STBC fields are set to 1. a 4x HE-LTE and 3.2 μs GI, otherwise |
| | B23-B25 | NSTS And Midamble Periodicity | 3 | If the Doppler field is 0, indicates the number of space-time streams. Set to the number of space-time streams minus 1 For an HE ER SU PPDU, values 2 to 7 are reserved If the Doppler field is 1, then B23-B24 indicates the number of space time streams, up to 4, and B25 indicates the midamble periodicity. B23-B24 is set to the number of space time streams minus 1. For an HE ER SU PPDU, values 2 and 3 are reserved B25 is set to 0 if TXVECTOR parameter MID-AMBLE_PERIODICITY is 10 and set to 1 if TXVECTOR parameter MIDAMBLE_PERIODICITY is 20. |
| HE-SIG-A2 (HE SU PPDU) or HE-SIG-A3 (HE ER SU PPDU) | B0-B6 | TXOP | 7 | Set to 127 to indicate no duration information if (#15491) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION − 512 )/128) (#16277). where (#16061) B0 indicates the TXOP length granularity. Set to 0 for 8 μs, otherwise set to 1 for 128 μs. B1-B6 indicates the scaled value of the TXOP_DURATION |

TABLE 1-continued

| Two Parts of HE-SIG-A | Bit | Field | Number of bits | Description |
|---|---|---|---|---|
| | B7 | Coding | 1 | Indicates whether BCC or LDPC is used:<br>Set to 0 to indicate BCC<br>Set to 1 to indicate LDPC |
| | B8 | LDPC Extra Symbol Segment | 1 | Indicates the presence of the extra OFDM symbol segment for LDPC:<br>Set to 1 if an extra OFDM symbol segment for LDPC is present<br>Set to 0 if an extra OFDM symbol segment for LDPC is not present<br>Reserved and set to 1 if the Coding field is set to 0(#15492). |
| | B9 | STBC | 1 | If the DCM field is set to 0, then set to 1 if space time block coding is used. Neither DCM nor STBC shall be applied if (#15493) both the DCM field and STBC field are set to 1.<br>Set to 0 otherwise. |
| | B10 | Beam-formed (#16038) | 1 | Set to 1 ifs beamthnning steering matrix is applied to the waveform in an SU transmission.<br>Set to 0 otherwise. |
| | B11-B12 | Pre-FEC Padding Factor | 2 | Indicates the pre-FEC padding factor_<br>Set to 0 to indicate a pre-FEC padding factor of 4<br>Set to 1 to indicate a pre-FEC padding factor of 1<br>Set to 2 to indicate a pre-FEC padding factor of 2<br>Set to 3 to indicate a pre-FEC padding factor of 3 |
| | B13 | PE Disambiguity | 1 | Indicates PE disambiguity (#16274) as defined in 28.3.12 (Packet extension). |
| | B14 | Reserved | 1 | Reserved and set to 1 |
| | B15 | Doppler | 1 | Set to 1 if one of the following applies:<br>the number of OFDM symbols in the Data field is larger than the signaled midamble periodicity plus 1 and the midamble is present<br>The number of OFDM symbols in the Data field is less than or equal to the signaled midamble periodicity plus 1 (see 28.3.11.16 Midamble), the midamble is not present, but the channel is fast varying. It recommends that midamble may be used for the PPDUs of the reverse link.<br>Set to 0 otherwise. |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to temunate the trellis of the convolutional decoder.<br>Set to 0. |

In addition, the HE-SIG-A field of the HE MU PPDU may be defined as follows.

TABLE 2

| Two Parts of HE-SIG-A | Bit | Field | Number of bits | Description |
|---|---|---|---|---|
| HE-SIG-A1 | B0 | UL/DL | 1 | Indicates whether the PPDU is sent UL or DL. Set to the value indicated by the TX VECTOR parameter UPLINK_FLAG.(#16805)<br>NOTE—The TDLS peer can identify the TDLS frame by To DS and From DS fields in the MAC header of the MPDU. |
| | B1-B3 | SIGB MCS | 3 | Indicates the MCS of the HE-SIG-B field:<br>Set to 0 for MCS 0<br>Set to 1 for MCS 1<br>Set to 2 for MCS 2<br>Set to 3 for MCS 3<br>Set to 4 for MCS 4<br>Set to 5 for MCS 5<br>The values 6 and 7 are reserved |
| | B4 | SIGB DCM | 1 | Set to 1 indicates that the HE-SIG-B is modulated with DCM for the MCS.<br>Set to 0 indicates that the HE-SIG-13 is not modulated with DCM for the MCS.<br>NOTE—DCM is only applicable to MCS 0, MCS 1, |

TABLE 2-continued

| Two Parts of HE-SIG-A | Bit | Field | Number of bits | Description |
|---|---|---|---|---|
| | | | | MCS 3, and MCS 4. |
| | B5-B10 | BSS Color | 6 | The BSS Color field is an identifier of the BSS Set to the value of the TXVECTOR parameter BSS_COLOR. |
| | B11-B14 | Spatial Reuse | 4 | Indicates whether or not spatial reuse is allowed during the transmission of this PPDU (#16806). Set to the value of the SPATIAL_REUSE parameter of the TXVECTOR, which contains a value from Table 28-21 (Spatial Reuse field encoding for an HE SU PPDU, HE ER SU PPDU, and HE MU PPDU) (see 27.11.6 (SPATIAL_REUSE)). Set to SRP_DISALLOW to prohibit SRP-based spatial reuse during this PPDU. Set to SRP_AND_NON_ SRG_OBSS_PD_PROTITBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B17 | Bandwidth | 3 | Set to 0 for 20 MHz. Set to 1 for 40 MHz. Set to 2 for 80 MHz non-preamble puncturing mode. Set to 3 for 160 MHz and 80 + 80 MHz non-preamble puncturing mode. If the SIGB Compression field is 0: Set to 4 for preamble puncturing in 80 MHz, where in the preamble only the secondary 20 MHz is punctured. Set to 5 for preamble puncturing in 80 MHz, where in the preamble only one of the two 20 MHz subchannels in secondary 40 MHz is punctured. Set to 6 for preamble puncturing in 160 MHz or 80 + 80 MHz, where in the primary 80 MHz of the preamble only the secondary 20 MHz is punctured. Set to 7 for preamble puncturing in 160 MHz or 80 + 80 MHz, where in the primary 80 MHz of the preamble the primary 40 MHz is present. If the SIGB Compression field is 1 then values 4-7 are reserved. |
| | B18-B21 | Number Of HE-SIG-B Symbols Or MU-MIMO Users | 4 | If the HE-SIG-B Compression field is set to 0, indicates the number of OFDM symbols in the HE-SIG-B field: (#15494) Set to the number of OFDM symbols in the HE-SIG-B field minus 1 if the number of OFDM symbols in the HE-SIG-B field is less than 16; Set to 15 to indicate that the number of OFDM symbols in the HE-SIG-B field is equal to 16 if Longer Than 16 HE-SIG-B OFDM Symbols Support subfield of the HE Capabilities element transmitted by at least one recipient STA is 0; Set to 15 to indicate that the number of OFDM symbols in the HE-SIG-B field is greater than or equal to16 if the Longer Than 16 HE-SIG-B OFDM Symbols Support subfield of the HE Capabilities element transmitted by all the recipient STAs are 1 and if the HE-SIG-B data rate is less than MCS 4 without DCM. The exact number of OFDM symbols in the HE-SIG-B field is calculated based on the number of User fields in the HE-SIG-B content channel which is indicated by HE-SIG-B common field in this case. If the HE-SIG-B Compression field is set to 1, indicates the number of MU-MIMO users and is set to the number of NU-MIMO users minus 1 (#15495). |
| | B22 | SIGB Compression | 1 | Set to 0 if the Common field in HE-SIG-B is present. Set to 1 if the Common field in HE-SIG-B is not present. (#16139) |
| | B23-B24 | GI + LTF Size | 2 | Indicatas the GI duration and HE-LTF size: Set to 0 to indicate a 4 × HE-LTF and 0.8 µs GI Set to 1 to indicate a 2 × HE-LTF and 0.8 µs GI Set to 2 to indicate a 2 × HE-LTF and 1.6 µs GI Set to 3 to indicate a 4 × HE-LTF and 3.2 µs GI |
| | B25 | Doppler | 1 | Set to 1 if one of the following applies: The number of OFDM symbols in the Data field is larger than the signaled midamble periodicity plus 1 and the midamble is present The number of OFDM symbols in the Data field is less than or equal to the signaled midamble periodicity plus 1 (see 28.3.11.16 Midamble), |

TABLE 2-continued

| Two Parts of HE-SIG-A | Bit | Field | Number of bits | Description |
|---|---|---|---|---|
| | | | | the midamble is not present, but the channel is fast varying. It recommends that midamble may be used for the PPDUs of the reverse link. Set to 0 otherwise. |
| HE-SIG-A2 | B0-B6 | TXOP | 7 | Set to 127 to indicate no duration information if (#15496) TXVECTOR parameter TXOP_DURATION is set to UNSPECIFIED. Set to a value less than 127 to indicate duration information for NAV setting and protection of the TXOP as follows: If TXVECTOR parameter TXOP_DURATION is less than 512, then B0 is set to 0 and B1-B6 is set to floor(TXOP_DURATION/8)(#16277). Otherwise, B0 is set to 1 and B1-B6 is set to floor ((TXOP_DURATION—512 )/128) (#16277). where(#16061) B0 indicates the TXOP length granularity. Set to 0 for 8 µs; otherwise set to 1 for 128 µs. B1-B6 indicates the scaled value of the TXOP_DURATION |
| | B7 | Reserved | 1 | Reserved and set to 1 |
| | B8-B10 | Number of HE-LTF Symbols And Midamble Periodicity | 3 | If the Doppler field is set to 0 (#15497), indicates the number of HE-LTF symbols: Set to 0 for 1 HE-LTF symbol Set to 1 for 2 HE-LTF symbols Set to 2 for 4 HE-LTF symbols Set to 3 for 6 HE-LTF symbols Set to 4 for 8 HE-LTF symbols Other values are reserved. If the Doppler field is set to 1 (#15498), B8-B9 indicates the number of HE-LTF symbols (#16056) and B10 indicates midamble periodicity: B8-B9 is encoded as follows: 0 indicates 1 HE-LIT symbol 1 indicates 2 HE-LIT symbols 2 indicates 4 HE-LIT symbols 3 is reserved B10 is set to 0 if the TXVECTOR parameter MIDAMBLE_PERIODICITY is 10 and set to 1 if the TXVECTOR parameter PREAMBLE_PERIODICITY is 20. |
| | B11 | LDPC Extra Symbol Segment | 1 | Indication of the presence of the extra OFDM symbol segment for LDPC. Set to 1 if an extra OEDM symbol segment for LDPC is present. Set to 0 otherwise. |
| | B12 | STBC | 1 | In an HE MU PPDU where each RU includes no more than 1 user, set to 110 indicate all RUs are STBC encoded in the payload, set to 0 to indicate all RUs are not STBC encoded in the payload. STBC does not apply to HE-SIG-B. STBC is not applied if one or more RUs are used for MU-MIMO allocation. (#15661) |
| | B13-B14 | Pre-FEC Padding Factor | 2 | Indicates the pre-FEC padding factor Set to 0 to indicate a pre-FEC padding factor of 4 Set to 1 to indicate a pre-FEC padding factor of 1 Set to 2 to indicate a pre-FEC padding factor of 2 Set to 3 to indicate a pre-FEC padding factor of 3 |
| | B15 | PE Disambiguity | 1 | Indicates PE disambiguity (#16274) as defined in 28.3.12 (Packet extension). |
| | B16-B19 | CRC | 4 | CRC for bits 0-41 of the HE-SIG-A field (see 28.3.10.7.3 (CRC computation)). Bits 0-41 of the HE-SIG-A field correspond to bits 0-25 of HE-SIG-A1 followed by bits 0-15 of HE-SIG-A2). |
| | B20-B25 | Tail | 6 | Used to terminate the trellis of the convolutional decoder. Set to 0. |

In addition, the HE-SIG-A field of the HE TB PPDU may be defined as follows.

TABLE 3

| Two Parts of HE-SIG-A | Bit | Field | Number of bits | Description |
|---|---|---|---|---|
| HE-SIG-A1 | B0 | Format | 1 | Differentiate an HE SU PPDU and HE ER SU PPDU from an HE TB PPDU. Set to 0 for an HE TB PPDU |
| | B1-B6 | BSS Color | 6 | The BSS Color field is an identifier a the BSS Set to the value of the TX VECTOR parameter BSS_COLOR. |
| | B7-B10 | Spatial Reuse 1 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz then this Spatial Reuse field applies to the first 20 MHz subband. If the Bandwidth field indicates 160/80 + 80 MHz then this Spatial Reuse field applies to the first 40 MHz subband of the 160 MHz operating band. Set to the value of the SPATIAL_REUSE(1) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP_DISALLOW to prohibit SRP-based spatial reuse dining this PPDU. Set to SRP_AND_NON_ SRG_OBSS_PD_PROHIBITED to prohibit both SRP-based spatial reuse and non-SRG OBSS PD-based spatial reuse during this PPDU. For the interpretation of other values see 27.11.6 (SPATIAL REUSE) and 27.9 (Spatial reuse operation). |
| | B11-B14 | Spatial Reuse 2 | 4 | Indicates whether or not spatial reuse is allowed ma subband of the PPDU during the transmission of this PPDU, and if allowed, indicates a value that is used to determine a limit on the transmit power of a spatial reuse transmission. If the Bandwidth field indicates 20 MHz, 40 MHz, or 80 MHz: This Spatial Reuse field applies to the second 20 MHz subband. If(#Ed) the STA operating channel width is 20 MHz, then this field is set to the same value as Spatial Reuse 1 field. If(#Ed) the STA operating channel width is 40 MHz in the 2.4 GHz band, this field is set to the same value as Spatial Reuse 1 field. IF the Bandwidth field indicates 160/80 + 80 MHz the this Spatial Reuse field applies to the second 40 MHz subband of the 160 MHz operating hand. Set to the value of the SPATIAL_REUSE(2) parameter of the TXVECTOR, which contains a value from Table 28-22 (Spatial Reuse field encoding for an HE TB PPDU) for an HE TB PPDU (see 27.11.6 (SPATIAL_REUSE)). Set to SRP DISALLOW to prohibit SRP-based spatial reuse during this PPDU. Set to SRP_AND_NON_ SRG_OBSS_PD_PROHIBITED to prohibit both SRP-based spatial reuse and non-SRG OBSS PD-based spatial reuse during this PPDU. For the interpretation of other values see 27.11.6 (SPATIAL_REUSE) and 27.9 (Spatial reuse operation). |
| | B15-B18 | Spatial Reuse 3 | 4 | Indicates whether or not spatial reuse is allowed in a subband of the PPDU during the transmission of this PPDU, and if allowed, indicates a value that is used to determine a limit on the transmit power of a spatial reuse transmission. If the Bandwidth field indicates 20 MHz, 40 MHz or 80 MHz: This Spatial Reuse field applies to the third 20 MHz subband. If(#Ed) the STA operating channel width is 20 MHz or 40 MHz, this field is set to the same value as Spatial Reuse 1 field. If the Bandwidth field indicates 160/80 + 80 MHz: This Spatial Reuse field applies to the third 40 MHz subband of the 160 MHz operating band. |

TABLE 3-continued

| Two Parts of HE-SIG-A | Bit | Field | Number of bits | Description |
|---|---|---|---|---|
| | | | | If (#Ed) the STA operating channel width is 80 + 80 MHz, this field is set to the same value as Spatial Reuse 1 field.<br>Set to the value of the SPATIAL_REUSE(3) parameter of the TXVECTOR, which contains a value from Table 28-22 (Spatial Reuse field encoding for an HE TB PPDU) for an HE TB PPDU (see 27.11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non-SRG OBSS PD-based spatial reuse during this PPDU For the interpretation of other valises see 27.11.6 (SPATIAL REUSE) and 27.9 (Spatial reuse operation). |
| | B19-B22 | Spatial Reuse 4 | 4 | Indicates whether or not spatial reuse is allowed in a subband of the PPDU during the transmission of this PPDU, and if allowed, indicates a value that is used to determine a limit on the transmit power of a spatial reuse transmission.<br>If the Bandwidth field indicates 20 MHz, 40 MHz Of 80 MHz:<br>This Spatial Reuse field applies to the fourth 20 MHz subband.<br>If (#Ed) the STA operating channel width is 20 MHz, then this field is set to the same value as Spatial Reuse 1 Field.<br>If (#Ed) the STA operating channel width is 40 MHz, then this field is set to the same value as Spatial Reuse 2 field.<br>If the Bandwidth field indicates 160/80 + 80 MHz:<br>This Spatial Reuse field applies to the fourth 40 MHz subband of the 160 MHz operating band.<br>If (#Ed) the STA operating channel width is 80 + 80 MHz, then this field is set to same value as Spatial Reuse 2 field.<br>Set to the value of the SPATIAL_REUSE(4) parameter of the TXVECTOR. which contains a value from Table 28-22 (Spatial Reuse field encoding for an HE TB PPDIJ) for an HE TB PPDU (see 27 11.6 (SPATIAL_REUSE)).<br>Set to SRP_DISALLOW to prohibit SRP-based spatial reuse during this PPDU. Set to SRP_AND_NON_SRG_OBSS_PD_PROHIBITED to prohibit both SRP-based spatial reuse and non- SRG OBSS PD-based spatial reuse during this PPDU. For the interpretation of other values see 27.11 6 (SPATIAL_REUSE) and 27.9 (Spatial reuse operation). |
| | B23 | Reserved | 1 | Reserved and set to 1.<br>NOTE—Unlike other Reserved fields in HE-SIG-A of the HE TB PPDU, B23 does not have a conesponding bit in the Trigger frame. |
| | B24-B25 | Bandwidth | 2 | (#16003) Set to 0 for 20 MHz<br>Set to 1 for 40 MHz<br>Set to 2 for 80 MHz<br>Set to 3 for 160 MHz and 80 + 80 MHz |
| HE-SIG-A2 | B0-B6 | TXOP | 7 | Set to 127 to indicate no duration information if(#15499) TXVECTOR parameter TXOP_DURATION is set to UNSPECIFIED<br>Set to a value less than 127 to indicate duration information for NAV setting and protection of the TXOP as follows:<br>If TXVECTOR parameter TXOP_DURATION is less than 512, then B0 is set to 0 and B1-B6 is set to floor(TXOP_DURATION/8)(#16277).<br>Otherwise, B0 is set to 1 and B1-B6 is set to floor ((TXOP_DURATION—512 )/128)(#16277).<br>where(#16061)<br>B0 indicates the TXOP length granularity. Set to 0 for 8 μs; otherwise set to 1 for 128 μs.<br>B1-B6 indicates the scaled value of the TXOP_DURATION |

TABLE 3-continued

| Two Parts of HE-SIG-A | Bit | Field | Number of bits | Description |
|---|---|---|---|---|
| | B7-B15 | Reserved | 9 | Reserved and set to value indicated in the UL HE-SIG-A2 Reserved subfield in the Trigger frame. |
| | B16-B19 | CRC | 4 | CRC of bits 0-41 of the HE-SIG-A field. See 28.3.10.7.3 (CRC computation). Bits 0-41 of the HE-SIG-A field correspond to bits 0-25 of HE-SIG-A1 followed by hits 0-15 of HE-SIG-A2). |
| | B20-B25 | Tail | 6 | Used to tenninate the trellis of the convolutional decoder. Set to 0. |

An HE-SIG-B (740) may be included only in the case of the PPDU for the multiple users (MUs) as described above. Principally, an HE-SIG-A (750) or an HE-SIG-B (760) may include resource allocation information (or virtual resource allocation information) for at least one receiving STA.

Figure 8:
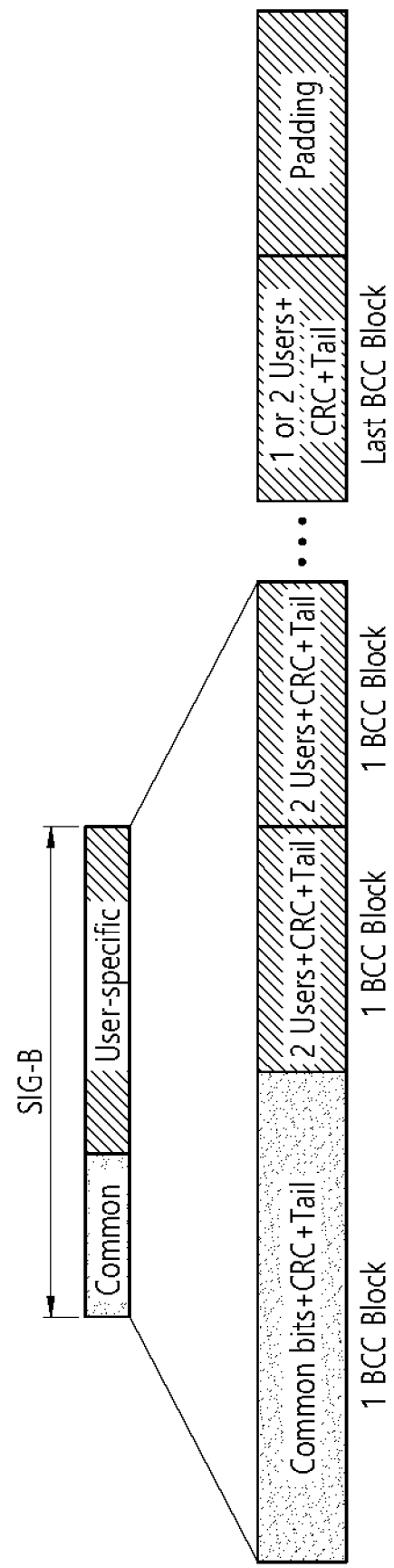
FIG. 8 is a block diagram illustrating one example of HE-SIG-B according to an embodiment.

FIG. 8 is a block diagram illustrating one example of HE-SIG-B according to an embodiment.

As shown in FIG. 8, the HE-SIG-B field includes a common field at a frontmost part and the corresponding common field is separated from a subsequent field so as to be encoded. That is, as shown in FIG. 8, the HE-SIG-B field may include a common field including the common control information and a user-specific field including user-specific control information. In this case, the common field may include a CRC field corresponding to the common field, and the like, and may be coded as one BCC block. The user-specific field that follows may be coded as one BCC block including the "user-specific field" for 2 users and the corresponding a CRC field, as shown in FIG. 8.

A previous field of the HE-SIG-B (740) may be transmitted in a replicated form on a MU PPDU. In the case of the HE-SIG-B (740), the HE-SIG-B (740) transmitted in some (or part) of the frequency band (e.g., a fourth frequency band) may even include control information for a data field corresponding to a corresponding frequency band (i.e., the fourth frequency band) and a data field of another frequency band (e.g., a second frequency band) other than the corresponding frequency band. Further, a format may be provided, in which the HE-SIG-B (740) in a specific frequency band (e.g., the second frequency band) is replicated with the HE-SIG-B (740) of another frequency band (e.g., the fourth frequency band). Alternatively, the HE-SIG B (740) may be transmitted in an encoded form on all transmission resources. A field after the HE-SIG B (740) may include individual information for respective receiving STAs receiving the PPDU.

An HE-STF 750 may be used for improving automatic gain control estimation in a multiple input multiple output (MIMO) environment or an OFDMA environment.

An HE-LTF 760 may be used for estimating a channel in the MIMO environment or the OFDMA environment.

The size of fast Fourier transform (FFT)/inverse fast Fourier transform (IFFT) applied to the HE-STF 750 and a field after the HE-STF 750 may be different from the size of FFT/IFFT applied to a field before the HE-STF 750. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field related to a legacy system, and the second field may include a field related to an HE system. In this case, the fast Fourier transform (FFT) size and the inverse fast Fourier transform (IFFT) size may be defined as a size which is N (N is a natural number, for example, N=1, 2, or 4) times larger than the FFT/IFFT size used in the legacy wireless LAN system. That is, the FFT/IFFT having the size may be applied, which is N(=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N(=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values, such as 0.4 μs, 0.8 μs, 1.6 μs, 2.4 μs, and 3.2 μs.

For convenience of description, FIG. 7 shows that a frequency band used for the first field and a frequency band used for the second field accurately correspond to each other, but both frequency bands may not completely correspond to each other in actual. For example, a primary band of the first field (L-STF, L-LTF, L-SIG, HE-SIG-A, and HE-SIG-B) corresponding to the first frequency band may be the same as a primary band of the second field (HE-STF, HE-LTF, and Data), but boundaries of the respective frequency bands may not correspond to each other. As illustrated in FIG. 4 to FIG. 6, since a plurality of null subcarriers, DC tones, guard tones, and the like are inserted when arranging RUs, it may be difficult to accurately adjust the boundaries.

A user, that is, a receiving STA, may receive the HE-SIG-A 730 and may be instructed to receive a downlink PPDU based on the HE-SIG-A 730. In this case, the STA may perform decoding based on the FFT size changed from the HE-STF 750 and the field after the HE-STF 750. On the contrary, when the STA may not be instructed to receive a downlink PPDU based on the HE-SIG-A 730, the STA may stop decoding and may configure a network allocation vector (NAV). A cyclic prefix (CP) of the HE-STF 750 may have a larger size than a CP of another field, and the STA may decode a downlink PPDU by changing the FFT size in a period of the CP.

Hereinafter, in an embodiment, data (or a frame) transmitted from an AP to an STA may be referred to as downlink data (or a downlink frame), and data (a frame) transmitted from an STA to an AP may be referred to as uplink data (an uplink frame). Further, transmission from an AP to an STA may be referred to as downlink transmission, and transmission from an STA to an AP may be referred to as uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (or a MAC protocol data unit (MPDU)). The PPDU header may include a PHY header and a PHY preamble and the PSDU (alternatively, MPDU) may include the frame or indicate the frame (or an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present specification is applied, the total bandwidth may be used for downlink transmission to one STA and uplink transmission to one STA. Further, in the wireless LAN system to which the embodiment of the present specification is applied, the AP may perform downlink (DL) multi-user (MU) transmission based on multiple input multiple output (MU MIMO), and the transmission may be expressed as the term DL MU MIMO transmission.

In addition, in the wireless LAN system according to the present embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. More specifically, in the wireless LAN system according to the present embodiment, the AP may perform the DL MU transmission based on the OFDMA, and the transmission may be expressed as the term DL MU OFDMA transmission. When the DL MU OFDMA transmission is performed, the AP may transmit the downlink data (or the downlink frame and the downlink PPDU) to the plurality of respective STAs through the plurality of respective frequency resources on an overlapped time resource. The plurality of frequency resources may be a plurality of subbands (or subchannels) or a plurality of resource units (RUs). The DL MU OFDMA transmission may be used together with the DL MU MIMO transmission. For example, the DL MU MIMO transmission based on a plurality of space-time streams (or spatial streams) may be performed on a specific subband (or subchannel) allocated for the DL MU OFDMA transmission.

Further, in the wireless LAN system according to the present embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (or subchannels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (or spatial streams) may be allocated to the plurality of respective STAs, and the plurality of respective STAs may transmit the uplink data to the AP through the different time-space streams. The transmission method through the different spatial streams may be expressed as the term UL MU MIMO transmission method.

The UL MU OFDMA transmission and the UL MU MIMO transmission may be used together with each other. For example, the UL MU MIMO transmission based on the plurality of space-time streams (or spatial streams) may be performed on a specific subband (or subchannel) allocated for the UL MU OFDMA transmission.

In the legacy wireless LAN system, which does not support the MU OFDMA transmission, a multi-channel allocation method is used for allocating a wider bandwidth (e.g., a bandwidth exceeding 20 MHz) to one user equipment (UE). When a channel unit is 20 MHz, multiple channels may include a plurality of 20 MHz-channels. In the multi-channel allocation method, a primary channel rule is used to allocate the wider bandwidth to the UE. When the primary channel rule is used, there is a limit for allocating the wider bandwidth to the UE. More specifically, according to the primary channel rule, when a secondary channel adjacent to a primary channel is used in an overlapped BSS (OBSS) and is, therefore, busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may act as a significant limitation (or restriction) in obtaining a high throughput by operating the wider bandwidth in a current wireless LAN environment, in which the OBSS is not small.

In order to solve the problem, in the present embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one UE but multiple UEs without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or subchannels) or different resource units (RUs).

The different frequency resources respective to each of the multiple STAs are indicated through a trigger frame.

Figure 9:
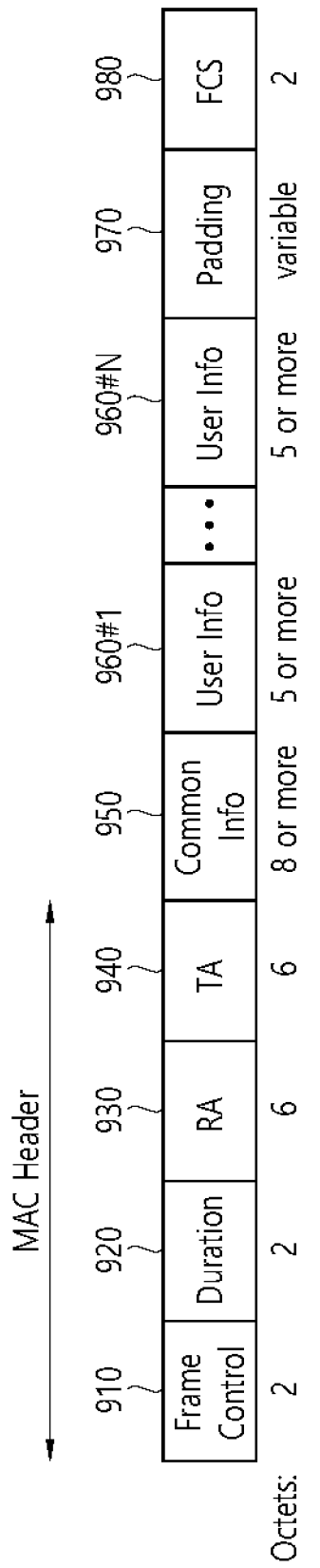
FIG. 9 illustrates an example of a trigger frame.

FIG. 9 illustrates an example of a trigger frame. The trigger frame illustrated in FIG. 9 allocates resources for uplink multiple-user (MU) transmission and may be transmitted from an AP. The trigger frame may be configured as a MAC frame and may be included in a PPDU. For example, the trigger frame may be transmitted through a PPDU shown in FIG. 3, a legacy PPDU shown in FIG. 2, or transmitted through a PPDU specially designed for a corresponding trigger frame. If transmitted through the PPDU of FIG. 3, the trigger frame may be included in the illustrated data field.

Some fields illustrated in FIG. 9 may be omitted, and other fields may be added. The length of each illustrated field may be varied.

A frame control field 910 shown in FIG. 9 may include information about a version of a MAC protocol and other additional control information, and a duration field 920 may include time information for NAV setting or information about an identifier (e.g., AID) of a STA.

An RA field 930 may include address information about a receiving STA of the trigger frame and may be optionally omitted. A TA field 940 includes address information about an STA (e.g., AP) for transmitting the trigger frame, and a common information field 950 includes common control information applied to the receiving STA for receiving the trigger frame. For example, a field indicating the length of an L-SIG field of an uplink PPDU transmitted in response to the trigger frame or information controlling the content of a SIG-A field (i.e., an HE-SIG-A field) of the uplink PPDU transmitted in response to the trigger frame may be included. Further, as the common control information, information about the length of a CP of the uplink PPDU transmitted in response to the trigger frame or information about the length of an LTF thereof may be included.

The trigger frame of FIG. 9 preferably includes per user information fields 960#1 to 960#N corresponding to the number of receiving STAs receiving the trigger frame of FIG. 9. A per user information field may also be referred to as an allocation field.

Further, the trigger frame of FIG. 9 may include a padding field 970 and a sequence field 980.

Each of the per user information fields 960#1 to 960#N illustrated in FIG. 9 preferably includes a plurality of subfields.

Figure 10:
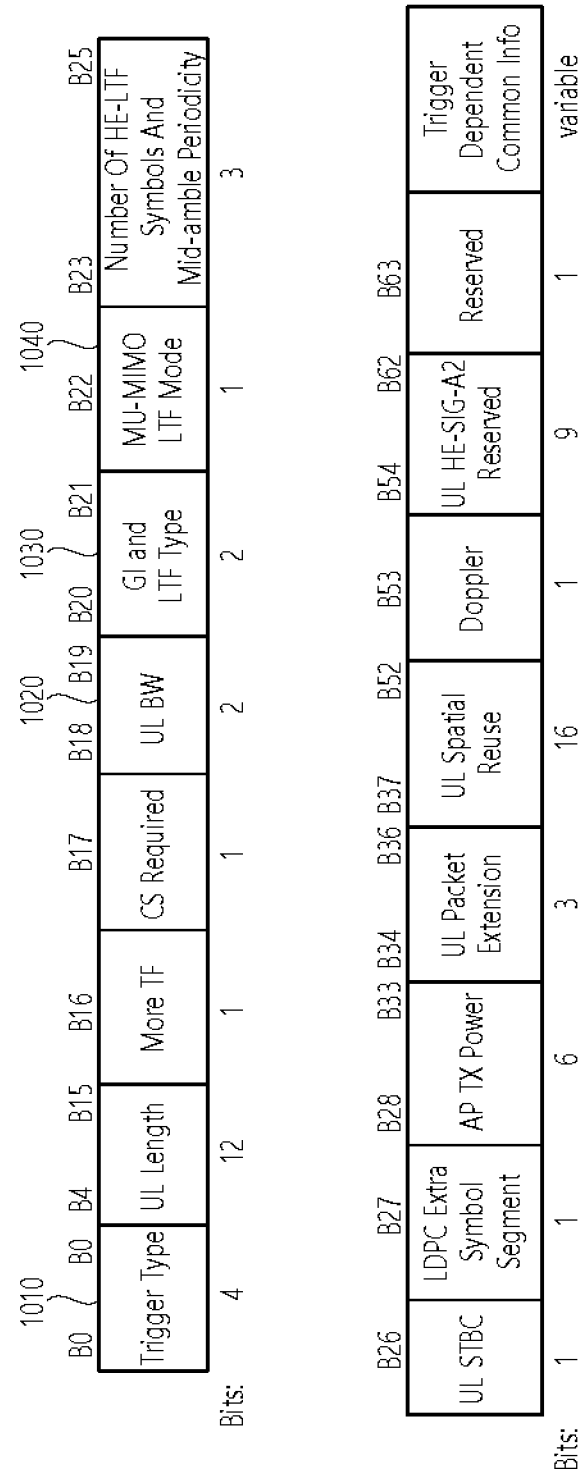
FIG. 10 illustrates an example of a subfield being included in a per user information field.

FIG. 10 illustrates an example of a common information field. Among the subfields of FIG. 10, some may be omitted, and other additional subfields may also be added. Additionally, the length of each of the subfields shown in the drawing may be varied.

The trigger type field (1010) of FIG. 10 may indicate a trigger frame variant and encoding of the trigger frame variant. The trigger type field (1010) may be defined as follows.

TABLE 4

| Trigger Type subfield value | Trigger frame variant |
|---|---|
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8-15 | Reserved |

The UL BW field (1020) of FIG. 10 indicates bandwidth in the HE-SIG-A field of an HE Trigger Based (TB) PPDU. The UL BW field (1020) may be defined as follows.

TABLE 5

| UL BW subfield value | Description |
|---|---|
| 0 | 20 MHz |
| 1 | 40 MHz |
| 2 | 80 MHz |
| 3 | 80 + 80 MHz or 160 MHz |

The Guard Interval (GI) and LTF type fields (1030) of FIG. 10 indicate the GI and HE-LTF type of the HE TB PPDU response. The GI and LTF type field (1030) may be defined as follows.

TABLE 6

| GI And LTF field value | Description |
|---|---|
| 0 | 1 × HE-LTF + 1.6 μs GI |
| 1 | 2 × HE-LTF + 1.6 μs GI |
| 2 | 4 × HE-LTT + 3.2 μs GI (#15968) |
| 3 | Reserved |

Also, when the GI and LTF type fields (1030) have a value of 2 or 3, the MU-MIMO LTF mode field (1040) of FIG. 10 indicates the LTF mode of a UL MU-MIMO HE TB PPDU response. At this time, the MU-MIMO LTF mode field (1040) may be defined as follows.

If the trigger frame allocates an RU that occupies the full (or whole) HE TB PPDU bandwidth and the RU is allocated to one or more STAs, the MU-MIMO LTF mode field (1040) indicates one of an HE single stream pilot HE-LTF mode or an HE masked HE-LTF sequence mode.

If the trigger frame does not allocate an RU that occupies the full (or whole) HE TB PPDU bandwidth and the RU is not allocated to one or more STAs, the MU-MIMO LTF mode field (1040) indicates the HE single stream pilot HE-LTF mode. The MU-MIMO LTF mode field (1040) may be defined as follows.

TABLE 7

| MU-MIMO LTF subfield value | Description |
|---|---|
| 0 | HE single stream pilot HE-LTF mode |
| 1 | HE masked HE-LTF sequence mode |

Figure 11:
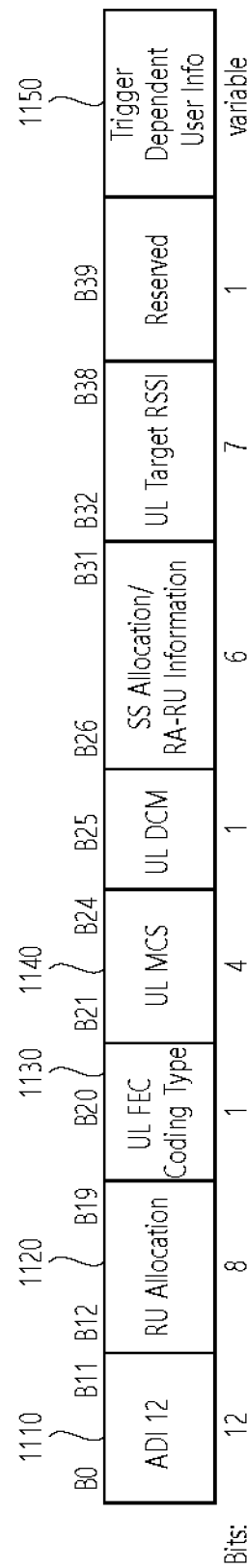
FIG. 11 is a block diagram showing an example of a control field and a data field being configured according to an embodiment of the present specification.

FIG. 11 illustrates an example of a subfield being included in a per user information field. Among the subfields of FIG. 11, some may be omitted, and other additional subfields may also be added. Additionally, the length of each of the subfields shown in the drawing may be varied.

The User Identifier field of FIG. 11 (or AID12 field, 1110) indicates the identifier of an STA (i.e., a receiving STA) corresponding to per user information, where an example of the identifier may be all or part of the AID.

Also, an RU Allocation field (1120) may be included. In other words, when a receiving STA identified by the User Identifier field (1110) transmits a UL PPDU in response to the trigger frame of FIG. 9, the corresponding UL PPDU is transmitted through an RU indicated by the RU Allocation field (1120). In this case, it is preferable that the RU indicated by the RU Allocation field (1120) indicates the RUs shown in FIGS. 4, 5, and 6. A specific structure of the RU Allocation field (1120) will be described later on.

The subfield of FIG. 11 may include a (UL FEC) coding type field (1130). The coding type field (1130) may indicate the coding type of an uplink PPDU transmitted in response to the trigger frame of FIG. 9. For example, when BCC coding is applied to the uplink PPDU, the coding type field (1130) may be set (or configured) to '1', and when LDPC coding is applied, the coding type field (1130) may be set to '0'.

Additionally, the subfield of FIG. 11 may include a UL MCS field (1140). The MCS field (1140) may indicate an MCS scheme being applied to the uplink PPDU that is transmitted in response to the trigger frame of FIG. 9.

Also, the subfield of FIG. 11 may include a Trigger Dependent User Info field (1150). When the Trigger Type field (1010) of FIG. 10 indicates a basic trigger variant, the Trigger Dependent User Info field (1150) may include an MPDU MU Spacing Factor subfield (2 bits), a TID Aggregate Limit subfield (3 bits), a Reserved field (1 bit), and a Preferred AC subfield (2 bits).

Hereinafter, the present disclosure proposes an example of improving a control field included in a PPDU. The control field improved according to the present disclosure includes a first control field including control information required to interpret the PPDU and a second control field including control information for demodulate the data field of the PPDU. The first and second control fields may be used for various fields. For example, the first control field may be the HE-SIG-A (730) of FIG. 7, and the second control field may be the HE-SIG-B (740) shown in FIGS. 7 and 8.

Hereinafter, a specific example of improving the first or second control field will be described.

In the following example, a control identifier inserted to the first control field or second control field is proposed. The size of the control identifier may vary, which, for example, may be implemented with 1-bit information.

The control identifier (e.g., a 1-bit identifier) may indicate whether a 242-type RU is allocated when, for example, 20 MHz transmission is performed. As shown in FIGS. 4 to 6, RUs of various sizes may be used. These RUs may be divided broadly into two types. For example, all of the RUs shown in FIGS. 4 to 6 may be classified into 26-type RUs and 242-type RUs. For example, a 26-type RU may include a 26-RU, a 52-RU, and a 106-RU while a 242-type RU may include a 242-RU, a 484-RU, and a larger RU.

The control identifier (for example, a 1-bit identifier) may indicate that a 242-type RU has been used. In other words, the control identifier may indicate that a 242-RU, a 484-RU, or a 996-RU is included. If the transmission frequency band in which a PPDU is transmitted has a bandwidth of 20 MHz, a 242-RU is a single RU corresponding to the full bandwidth of the transmission frequency band (i.e., 20 MHz). Accordingly, the control identifier (e.g., 1-bit identifier) may indicate whether a single RU corresponding to the full bandwidth of the transmission frequency band is allocated.

For example, if the transmission frequency band has a bandwidth of 40 MHz, the control identifier (e.g., a 1-bit identifier) may indicate whether a single RU corresponding to the full bandwidth (i.e., bandwidth of 40 MHz) of the transmission frequency band has been allocated. In other words, the control identifier may indicate whether a 484-RU has been allocated for transmission in the frequency band with a bandwidth of 40 MHz.

For example, if the transmission frequency band has a bandwidth of 80 MHz, the control identifier (e.g., a 1-bit identifier) may indicate whether a single RU corresponding to the full bandwidth (i.e., bandwidth of 80 MHz) of the transmission frequency band has been allocated. In other words, the control identifier may indicate whether a 996-RU has been allocated for transmission in the frequency band with a bandwidth of 80 MHz.

Various technical effects may be achieved through the control identifier (e.g., 1-bit identifier).

Firstly, when a single RU corresponding to the full bandwidth of the transmission frequency band is allocated through the control identifier (e.g., a 1-bit identifier), allocation information of the RU may be omitted. In other words, since only one RU rather than a plurality of RUs is allocated over the whole transmission frequency band, allocation information of the RU may be omitted deliberately.

Also, the control identifier may be used as signaling for full bandwidth MU-MIMO. For example, when a single RU is allocated over the full bandwidth of the transmission frequency band, multiple users may be allocated to the corresponding single RU. In other words, even though signals for each user are not distinctive in the temporal and spatial domains, other techniques (e.g., spatial multiplexing) may be used to multiplex the signals for multiple users in the same single RU. Accordingly, the control identifier (e.g., a 1-bit identifier) may also be used to indicate whether to use the full bandwidth MU-MIMO described above.

The common field included in the second control field (HE-SIG-B, 740) may include an RU allocation subfield. According to the PPDU bandwidth, the common field may include a plurality of RU allocation subfields (including N number of RU allocation subfields). The format of the common field may be defined as follows.

TABLE 8

| Subfield | Number of bits | Description |
|---|---|---|
| RU Allocation | N × 8 | Indicates the RU assignment to be used in the data portion in the frequency domain. It also indicates the number of users in each RU. For RUs of size greater than or equal to 106-tones that support MU-MIMO, it indicates the number of users multiplexed using MU-MIMO. Consists of N RU Allocation subfields: N = 1 for a 20 MHz and a 40 MHz HE MU PPDU N = 2 for an 80 MHz HE MU PPDU N = 4 for a 160 MHz or 80 + 80 MHz HE MU PPDU |

TABLE 8-continued

Figure 28:
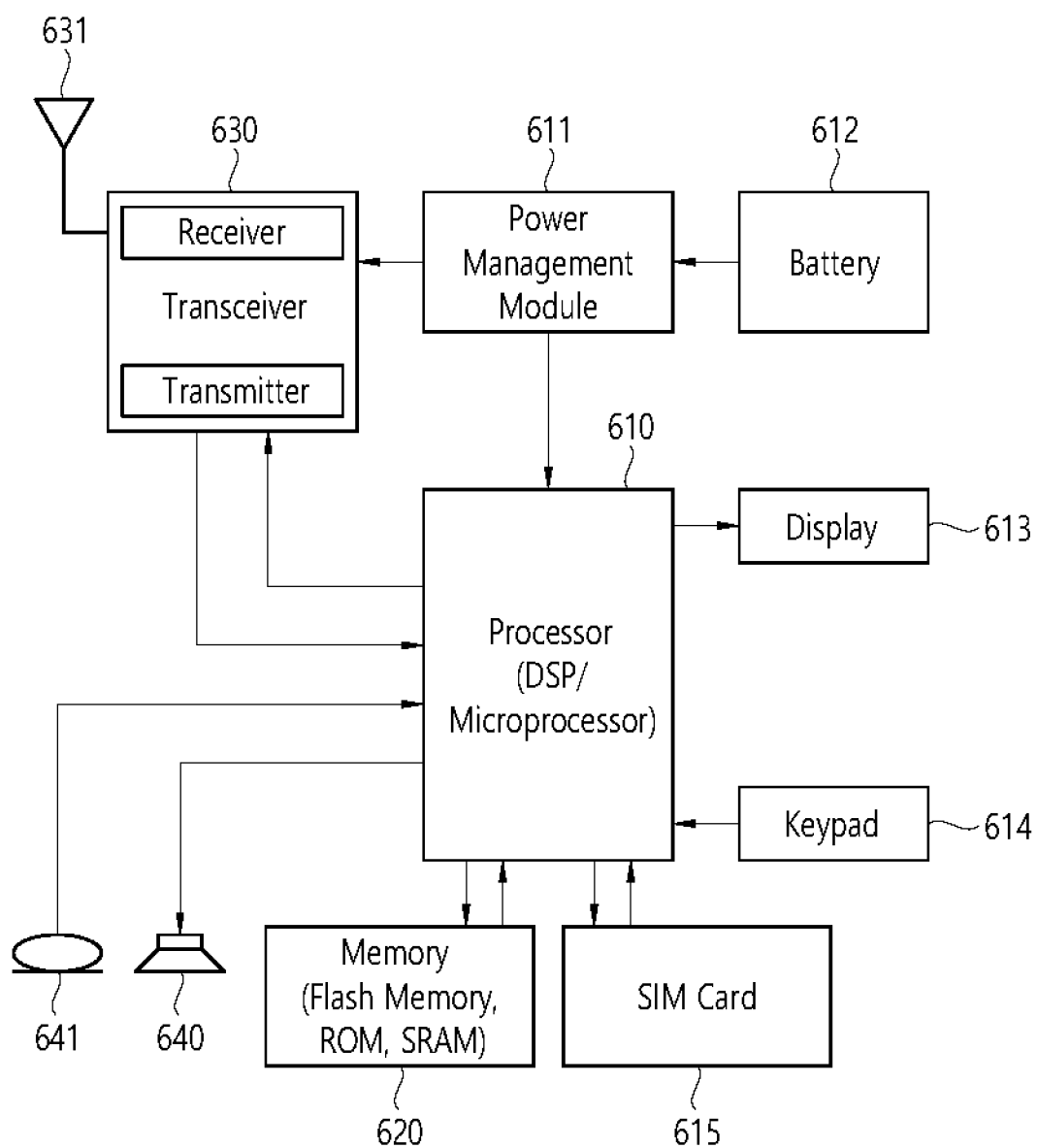
FIG. 28 shows a more detailed wireless device (or apparatus) implementing an embodiment according to the present specification.

| Subfield | Number of bits | Description |
|---|---|---|
| Center 26-tone RU | 1 | This field is present only if(#15510) the value of the Bandwidth field of HE-SIG-A field in an HE MU PPDU is set to greater than 1.<br>If the Bandwidth field of the HE-SIG-A field in an HE MU PPDU is set to 2, 4 or 5 for 80 MHz:<br>Set to 1 to indicate that a user is allocated to the center 26-tone RU (see FIG. 28-7 (RU locations in an 80 MHz HE PPDU(#16528))); otherwise, set to 0. The same value is applied to both HE-SIG-B content channels.<br>If the Bandwidth field of the HE-SIG-A field in an HE MU PPDU is set to 3, 6 or 7 for 160 MHz or 80 + 80 MHz:<br>For HE-SIG-B content channel 1, set to 1 to indicate that a user is allocated to the center 26-tone RU of the lower frequency 80 MHz; otherwise, set to 0.<br>For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the trellis of the convolutional decoder. Set to 0 |

The RU allocation subfield included in the common field of the HE-SIG-B may be configured with 8 bits and may indicate the following for a 20 MHz PPDU bandwidth. RUs to be used as a data portion in the frequency domain are allocated using an index for RU size and RU deployment (or positioning) in the frequency domain. The mapping between an 8-bit RU allocation subfield for RU allocation and the number of users per RU may be defined as follows.

TABLE 9

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | 52 | | | 1 |
| 00000100 | 26 | 26 | 52 | 26 | 26 | 26 | 26 | 26 | | 1 |
| 00000101 | 26 | 26 | 52 | 26 | 26 | 26 | 52 | | | 1 |
| 00000110 | 26 | 26 | 52 | 26 | 52 | 26 | 26 | | | 1 |
| 00000111 | 26 | 26 | 52 | 26 | 52 | 52 | | | | 1 |
| 00001000 | 52 | 26 | 26 | 26 | 26 | 26 | 26 | 26 | | 1 |
| 00001001 | 52 | 26 | 26 | 26 | 26 | 26 | 52 | | | 1 |
| 00001010 | 52 | 26 | 26 | 26 | 52 | 26 | 26 | | | 1 |
| 00001011 | 52 | 26 | 26 | 26 | 52 | 52 | | | | 1 |
| 00001100 | 52 | 52 | 26 | 26 | 26 | 26 | | | | 1 |
| 00001101 | 52 | 52 | 26 | 26 | 26 | 52 | | | | 1 |
| 00001110 | 52 | 52 | 26 | 52 | 26 | 26 | | | | 1 |
| 00001111 | 52 | 52 | 26 | 52 | 52 | | | | | 1 |
| $00010y_2y_1y_0$ | 52 | 52 | — | 106 | | | | | | 8 |
| $00011y_2y_1y_0$ | 106 | — | 52 | 52 | | | | | | 8 |
| $00100y_2y_1y_0$ | 26 | 26 | 26 | 26 | 26 | 106 | | | | 8 |
| $00101y_2y_1y_0$ | 26 | 26 | 52 | 26 | 106 | | | | | 8 |
| $00110y_2y_1y_0$ | 52 | 26 | 26 | 26 | 106 | | | | | 8 |
| $00111y_2y_1y_0$ | 52 | 52 | 26 | 106 | | | | | | 8 |
| $01000y_2y_1y_0$ | 106 | 26 | 26 | 26 | 26 | 26 | | | | 8 |
| $01001y_2y_1y_0$ | 106 | 26 | 26 | 26 | 52 | | | | | 8 |
| $01010y_2y_1y_0$ | 106 | 26 | 52 | 26 | 26 | | | | | 8 |
| $01011y_2y_1y_0$ | 106 | 26 | 52 | 52 | | | | | | 8 |
| $0110y_1y_0z_1z_0$ | 106 | — | 106 | | | | | | | 16 |
| 01110000 | 52 | 52 | — | 52 | 52 | | | | | 1 |
| 01110001 | 242-tone RU empty | | | | | | | | | 1 |
| 01110010 | 484-tone RU with zero User fields indicated in this RU Allocation subfield of the HE-SIG-B content channel | | | | | | | | | 1 |
| 01110011 | 996 tone RU with zero User fields indicated in this RU Allocation subfield of the HE-SIG-B content channel | | | | | | | | | 1 |
| $011101x_1x_0$ | Reserved | | | | | | | | | 4 |
| $01111y_2y_1y_0$ | Reserved | | | | | | | | | 8 |
| $10y_2y_1y_0z_2z_1z_0$ | 106 | 26 | 106 | | | | | | | 64 |
| $11000y_2y_1y_0$ | 242 | | | | | | | | | 8 |
| $11001y_2y_1y_0$ | 484 | | | | | | | | | 8 |

TABLE 9-continued

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 11010$y_2y_1y_0$ | | | | | 996 | | | | | 8 |
| 11011$y_2y_1y_0$ | | | | | Reserved | | | | | 8 |
| 111$x_4x_3x_2x_1x_0$ | | | | | Reserved | | | | | 32 |

If(#Ed) signaling RUs of size greater than 242 subcarriers, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU.
$z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU.
Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU.
Similarly, $z_1z_0$ = 00-11 indicates the number of STAs multiplexed in the higher frequency 106-tone RU. The binary vector $z_1z_0$ indicates $2^1 \times z_1 + z_0 + 1$ STAs multiplexed in the RU.
1 to #9 (from left to the right) is ordered in increasing order of the absolute frequency.
$x_1x_0$ = 00-11, $x_4x_3x_2x_1x_0$ = 00000-11111.
"—" means no STA in that RU.

The user-specific field included in the second control field (HE-SIG-B, 740) may include a user field, a CRC field, and a Tail field. The format of the user-specific field may be defined as follows.

TABLE 10

| Subfield | Number of bits | Description |
|---|---|---|
| User field | N × 21 | The User field format for a non-MU-MIMO allocation is defined in Table 28-26 (User field format for a non-MU-MIMO allocation). The User field format for a MU-MIMO allocation is defined in Table 28-27 (User field for an MU-MIMO allocation). N = 1 if it is the last User Block field, and if there is only one user in the last User Block field. N = 2 otherwise. |
| CRC | 4 | The CRC is calculated over bits 0 to 20 for a User Block field that contains one User field, and bits 0 to 41 for a User Block field that contains two User fields. See 28.3.10.7.3 (CRC computation). |
| Tail | 6 | Used to terminate the trellis of the convolutional decoder. Set to 0. |

Also, the user-specific field of the HE-SIG-B is configured of a plurality of user fields. The plurality of user fields are located after the common field of the HE-SIG-B. The location of the RU allocation subfield of the common field and that of the user field of the user-specific field are used together to identify an RU used for transmitting data of an STA. A plurality of RUs designated as a single STA are now allowed in the user-specific field. Therefore, signaling that allows an STA to decode its own data is transmitted only from one user field.

As an example, it may be assumed that the RU allocation subfield is configured of 8 bits of 01000010 to indicate that five 26-tone RUs are arranged next to one 106-tone RU and three user fields are included in the 106-tone RU. Herein, the 106-tone RU may support multiplexing of the three users. This example may indicate that eight user fields included in the user-specific field are mapped to six RUs, the first three user fields are allocated according to the MU-MIMO scheme in the first 106-tone RU, and the remaining five user fields are allocated to each of the five 26-tone RUs.

User fields included in the user-specific field of the HE-SIG-B may be defined as described below. Firstly, user fields for non-MU-MIMO allocation are described as follows.

TABLE 12

| Bit | Subfield | Number of bits | Description |
|---|---|---|---|
| B0-B10 | STA-ID | 11 | Set to a value of the element indicated from TXVECTOR parameter STA_ID_LIST (see 27.11.1 (STA_ID_LIST)). |
| B11-B13 | NSTS | 3 | Number of space-time streams. Set to the number of space-time streams minus 1. |
| B14 | Beam-formed(#160 38) | 1 | Use of transmit beamforming. Set to 1 if a be forming steering matrix is applied to the waveform in an SU transmission. Set to 0 otherwise. |
| B15-B18 | MCS | 4 | Modulation and coding scheme Set to n for MCSn, where n = 0, 1, 2, . . . , 11 Values 12 to 15 are reserved |
| B19 | DCM | 1 | Indicates whether or not DCM is used. Set to 1 to indicate that the payload(#Ed) of the corresponding user of the HE MU PPDU is modulated with DCM for the MCS. Set to 0 to indicate that the payload of the corresponding user of the PPDU is not modulated with DCM for the MCS. NOTE—DCM is not applied in combination with STBC.(#15664) |
| B20 | Coding | 1 | Indicates whether BCC or LDPC is used. Set to 0 for BCC Set to 1 for LDPC |

NOTE—If the STA-ID subfield is set to 2046, then the other subfields can he set to arbitrary values.(#15946)

User fields for MU-MIMO allocation are described as follows.

TABLE 13

| Bit | Subfield | Number of bits | Description |
|---|---|---|---|
| B0-B10 | STA-ID | 11 | Set to a value of element indicated from TXVECTOR parameter STA_ID_LIST (see 27.11.1 (STA_ID_LIST)). |
| B11-B14 | Spatial Configuration | 4 | Indicates the number of spatial streams for a STA in an MU-MIMO allocation (see Table 28-28 (Spatial Configuration subfield encoding)). |

TABLE 13-continued

| Bit | Subfield | Number of bits | Description |
| --- | --- | --- | --- |
| B15-B18 | MCS | 4 | Modulation and coding scheme. Set to n for MCSn, where n = 0, 1, 2, . . . , 11 Values 12 to 15 are reserved |
| B19 | Reserved | 1 | Reserved and set to 0 |
| B20 | Coding | 1 | Indicates whether BCC or LDPC is used. Set to 0 for BCC Set to 1 for LDPC |

NOTE If the STA-ID subfield is set to 2046, then the other subfields can be set to arbitrary values. (#15946)

Figure 12:
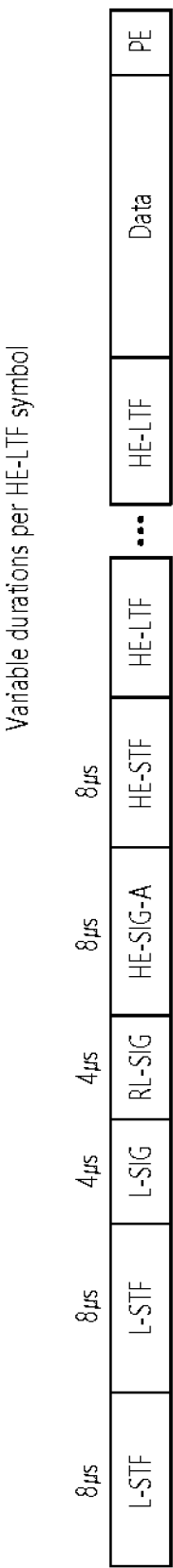
FIG. 12 illustrates an example of an HE TB PPDU.

FIG. 12 illustrates an example of an HE TB PPDU. The PPDU of FIG. 12 illustrates an uplink PPDU transmitted in response to the trigger frame of FIG. 9. At least one STA receiving a trigger frame from an AP may check the common information field and the individual user information field of the trigger frame and may transmit a HE TB PPDU simultaneously with another STA which has received the trigger frame.

As shown in the diagram, the PPDU of FIG. 12 includes various fields, each of which corresponds to the field shown in FIGS. 2, 3, and 7. Meanwhile, as shown in the diagram, the HE TB PPDU (or uplink PPDU) of FIG. 12 may only include the HE-SIG-A field and not include the HE-SIG-B field.

1. Carrier Sense Multiple Access/Collision Avoidance (CSMA/CA)

In IEEE 802.11, communication is achieved in a shared wireless medium, and thus has a characteristic fundamentally different from a wired channel environment. For example, communication is possible based on carrier sense multiple access/collision detection (CSMA/CD) in the wired channel environment. For example, when a signal is transmitted one time in Tx, the signal is transmitted to Rx without significant signal attenuation since a channel environment does not change much. In this case, when a collision occurs in two or more signals, it is detectable. This is because power detected in Rx is instantaneously greater than power transmitted in Tx. However, in a wireless channel environment, a channel is affected by various factors (e.g., a signal may be significantly attenuated according to a distance or may instantaneously experience deep fading), carrier sensing cannot be achieved correctly in Tx as to whether a signal is properly transmitted in Rx in practice or whether a collision (or conflict) exists. Therefore, a distributed coordination function (DCF), which is a carrier sense multiple access/collision avoidance (CSMA/CA) mechanism, is introduced in 802.11. Herein, stations (STAs) having data intended to be transmitted perform clear channel assessment (CCA) for sensing a medium during a specific duration (e.g., DCF inter-frame space (DIFS)) before transmitting the data. In this case, if the medium is idle, the STA may transmit the data by using the medium. On the other hand, if the medium is busy, under the assumption that several STAs have already waited for the use of the medium, the data may be transmitted after waiting for a random backoff period in addition to the DIFS. In this case, the random backoff period may allow the collision to be avoidable because, under the assumption that there are several STAs for transmitting data, each STA has a different backoff interval stochastically and, thus, eventually has a different transmission time. When one STA starts transmission, the other STAs cannot use the medium.

The random backoff time and the procedure will be simply described as follows. When a specific medium transitions (or shifts) from busy to idle, several STAs start a preparation for data transmission. In this case, to minimize collision (or conflict), the STAs intending to transmit the data select respective random backoff counts and wait by those slot times. The random backoff count is a pseudo-random integer value, and one of uniform distribution values is selected in the range of [0 CW]. Herein, CW denotes a contention window. A CW parameter takes a CWmin value as an initial value, and when transmission fails, the value is doubled. For example, if an ACK response is not received in response to a transmitted data frame, it may be regarded that a collision occurs. If the CW value has a CWmax value, the CWmax value is maintained until data transmission is successful, and when the data transmission is successful, the CW value is reset to the CWmin value. In this case, the values CW, CWmin, and CWmax are preferably maintained to $2^n-1$ for convenience of implementations and operations. Meanwhile, if the random backoff procedure starts, the STA selects the random backoff count in the [0 CW] range and, thereafter, continuously monitors a medium while counting down a backoff slot. In the meantime, if the medium enters a busy state, the countdown is stopped, and when the medium returns to an idle state, the countdown of the remaining backoff slots is resumed.

The very basis of CSMA/CA is carrier sense. A user equipment (UE) (or terminal) uses physical carrier sense and virtual carrier sense in order to determine whether or not a DCF medium is busy/idle. Physical carrier sense is carried out in a physical layer (PHY) and is carried out through energy detection or preamble detection. For example, when it is determined that a voltage level is measured or a preamble is read in a Rx end (or receiver), a medium may be determined to be in a busy state. Virtual carrier sense is carried out through a Duration field value by configuring a network allocation vector (NAV) so that other STAs cannot transmit data.

2. PHY Procedure

Although a specific packet configuration method may differ, a PHY transmit/receive procedure in Wi-Fi is as follows. For convenience, only 11n and 11ax will be given as examples. However, 11g/ac shall also follow a similar procedure.

That is, in the PHY transmit procedure, a MAC protocol data unit (MPDU) or an aggregate MPDU (A-MPDU) transmitted from a MAC end is converted into a single PHY service data unit (PSDU) in a PHY end, and is transmitted by inserting a preamble, tail bits, and padding bits (optional), and this is referred to as a PPDU.

Generally, the PHY receive procedure is as follows. When performing energy detection and preamble detection (L/HT/VHT/HE-preamble detection for each Wi-Fi version), information on a PSDU configuration is obtained from a PHY header (L/HT/VHT/HE-SIG) so as to read a MAC header and then to read data.

In an Extremely High Throughput (EHT) TIG of IEEE 802.11, as one of the next generation Wi-Fi features, the following methods are proposed based on multi-AP coordination.

3. Enhancement of a Multi-AP System

Mesh Wi-Fi (a Multi-AP solution) is being accepted in the market for a more enhanced application range, easier deployment, and higher throughput.

It is preferable to enhance Mesh Wi-Fi performance via joint optimization of MAC and PHY for a multi-AP system.

Hardware for multi-AP systems has already been launched in the market, and, unlike the 16 spatial streams, almost no cost occurs.

Excellent technologies for enhancing the performance of multi-AP systems exist. Such technologies may include distributed MIMO, cooperative transmission, space/time/frequency sharing and reuse, effective relay scheme, and so on.

Figure 13:
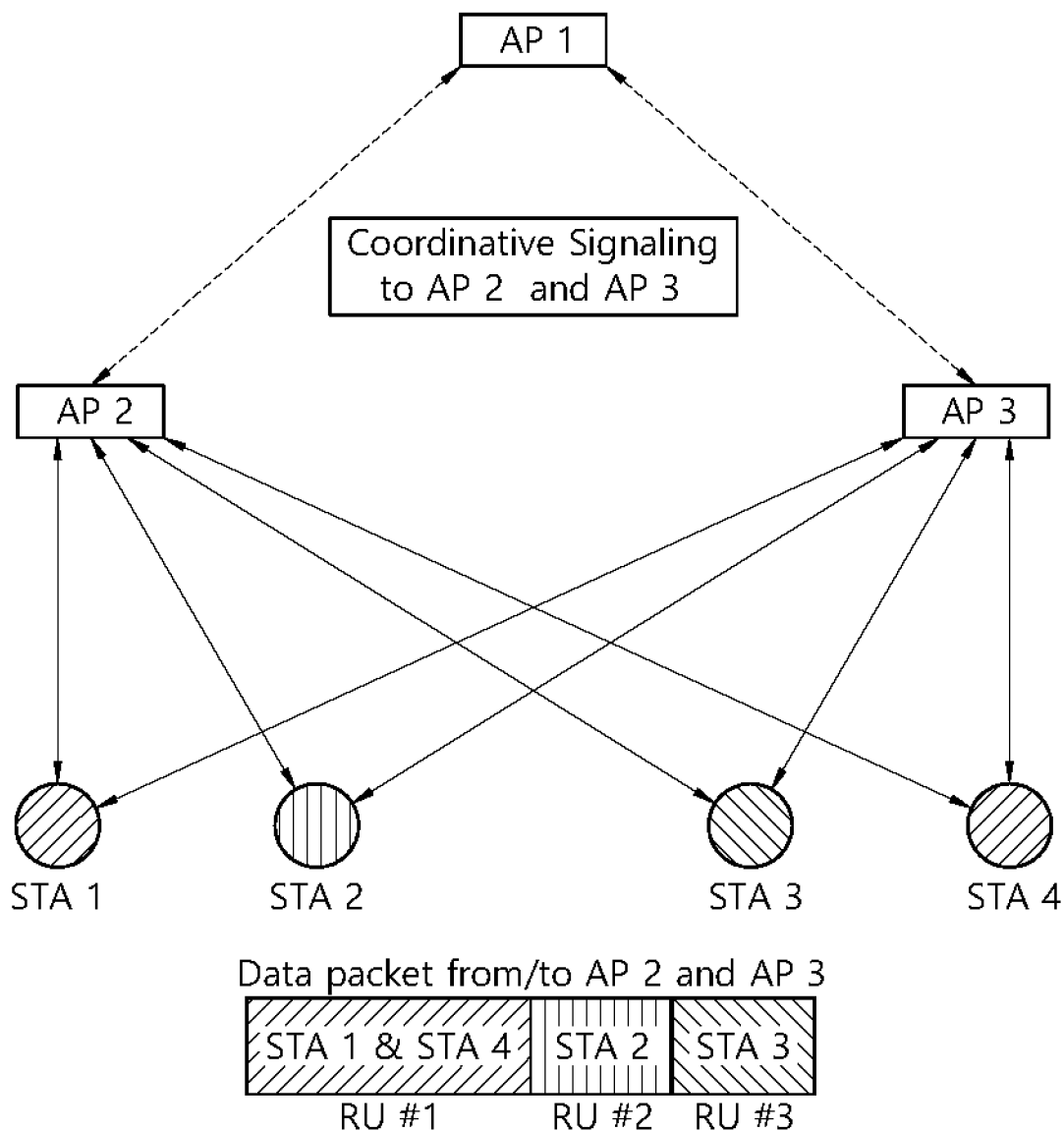
FIG. 13 shows an example of activating joint multi-AP transmission.

FIG. 13 shows an example of activating joint multi-AP transmission. Referring to FIG. 13, AP 1 initiates joint transmission by sending a coordination signal to AP 2 and AP 3. AP 2 and AP 3 transmit and receive data to and from multiple STAs by using OFDMA and MU-MIMO within one data packet. Each of STA 2 and STA 3 exists in a different resource unit (RU), and each RU is a frequency segment. STA 1 and STA 4 exist in the same resource unit (RU) by using MU-MIMO. Each RU may be transmitted to multiple spatial streams.

4. Multi-AP Coordination

Figure 14:
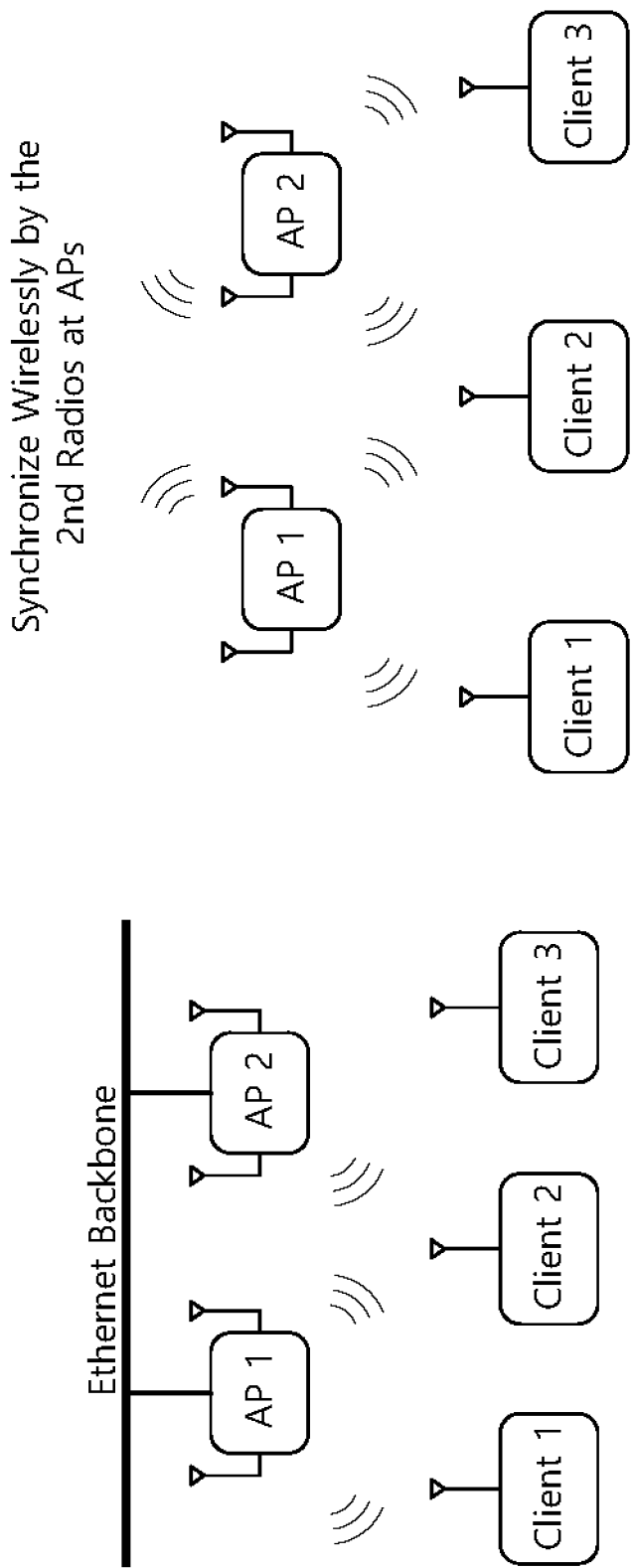
FIG. 14 is a diagram showing multi-AP coordination.

FIG. 14 is a diagram showing multi-AP coordination.

Multi-AP coordination uses wired (e.g., enterprise) backbone or wireless (e.g., home mesh) backbone for data+clock synchronization.

Additionally, multi-AP coordination has a more improved link budget and more regulated power limitations as compared to a single AP having a large antenna array.

Techniques for multi-AP coordination include Null Steering for Interference Avoidance, joint beamforming, and joint MU-MIMO.

Example 1: Null Steering for Interference Avoidance

Figure 15:
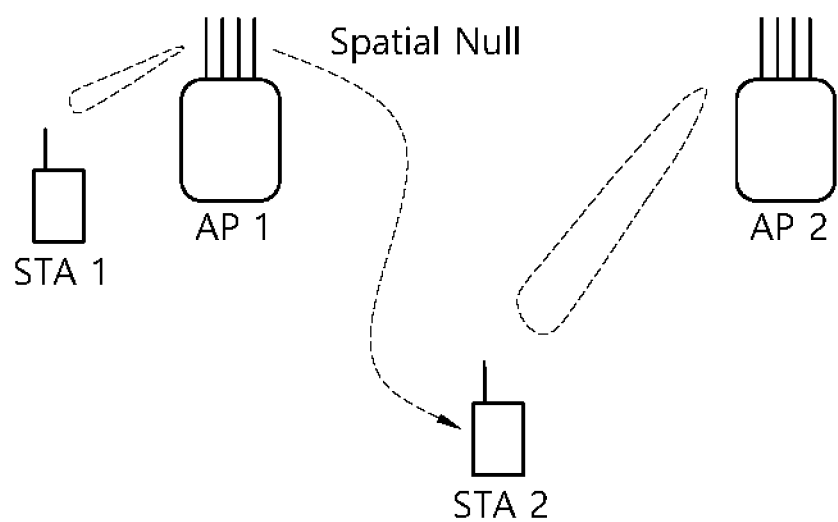
FIG. 15 shows an example of a null steering operation for interference avoidance.

FIG. 15 shows an example of a null steering operation for interference avoidance. Null steering for interference avoidance is useful in case the AP has a large dimension (4×4 or 8×8).

5. AP Coordination

Figure 16:
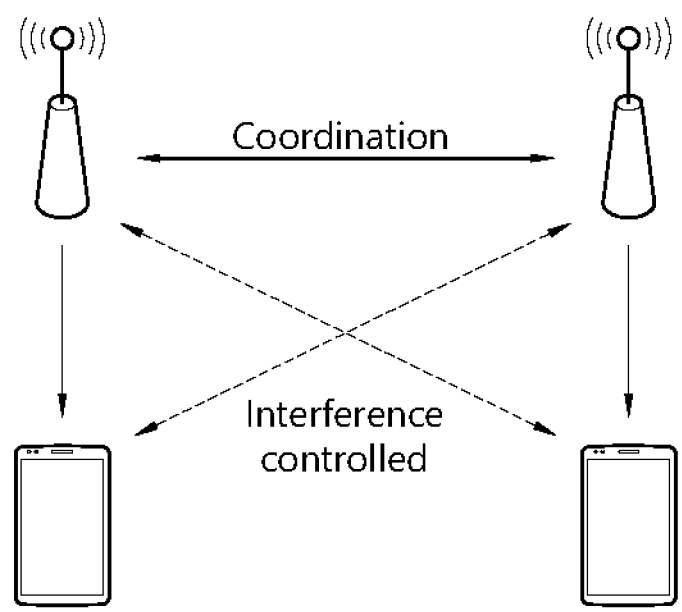
FIG. 16 shows an example wherein AP coordination and interference are being controlled.

FIG. 16 shows an example wherein AP coordination and interference are being controlled.

Coordinated scheduling: Coordinated scheduling mitigates/reduces the number of collisions (or conflicts) from a(n) AP/STA of another BSS.

Additionally, coordinated scheduling is a distributed mechanism and increases the number/probability of parallel transmission in a coordinated manner more than spatial reuse. Herein, message exchange between APs is required.

Figure 17:
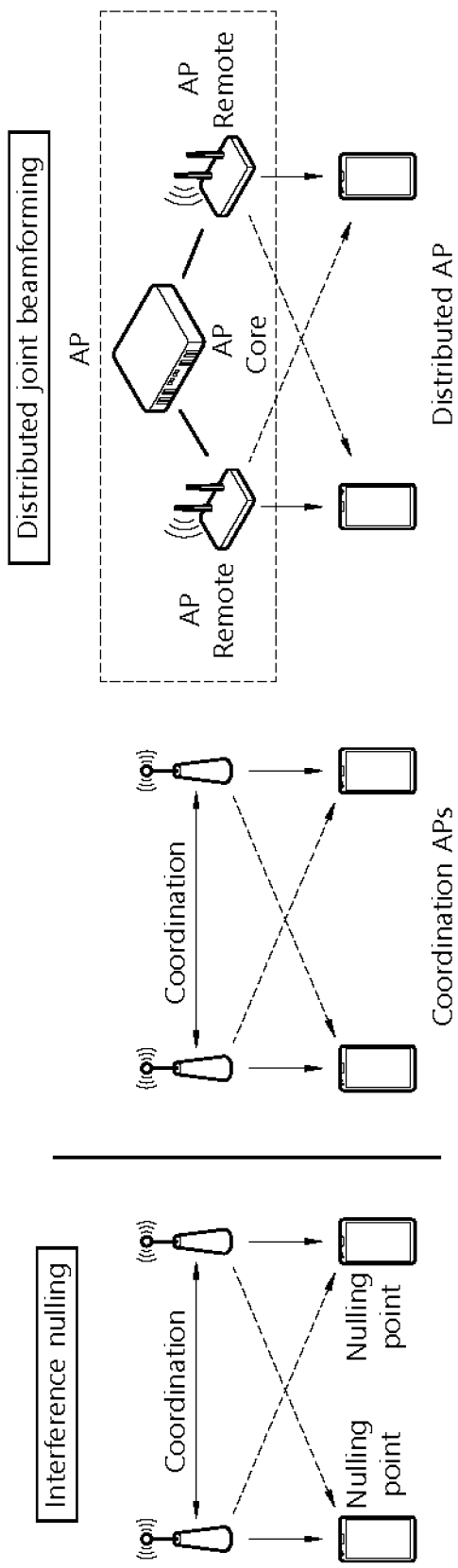
FIG. 17 shows interference nulling and distributed joint beamforming.

FIG. 17 shows interference nulling and distributed joint beamforming.

Coordinated beamforming: Coordinated beamforming may designate a nulling point to another STA or perform downlink transmission at the same time without co-channel interference caused by beamforming, such as distributed joint beamforming.

Additionally, coordinated beamforming is appropriate for managed deployments (e.g., corporate offices, hotels) and has the advantage of area throughput and a consistent user experience. Moreover, adjusted beamforming requires adjusted downlink scheduling and improved MU sounding in order to reduce overhead and synchronization, and so on.

Figure 18:
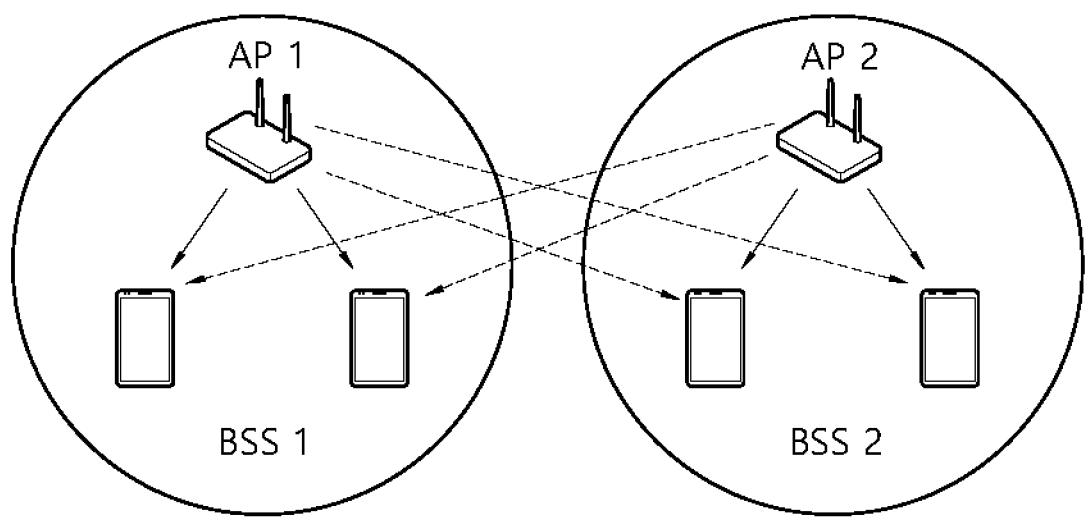
FIG. 18 shows an example of coordinated beamforming.

FIG. 18 shows an example of coordinated beamforming.

The solid arrow in FIG. 18 indicates data transmission within a BSS STA, and the dotted arrow in FIG. 18 is a null transmitted to OBSS STAs. As a main attribute, a signal to a user is transmitted from only one AP while forming a null in the OBSS STA.

Figure 19:
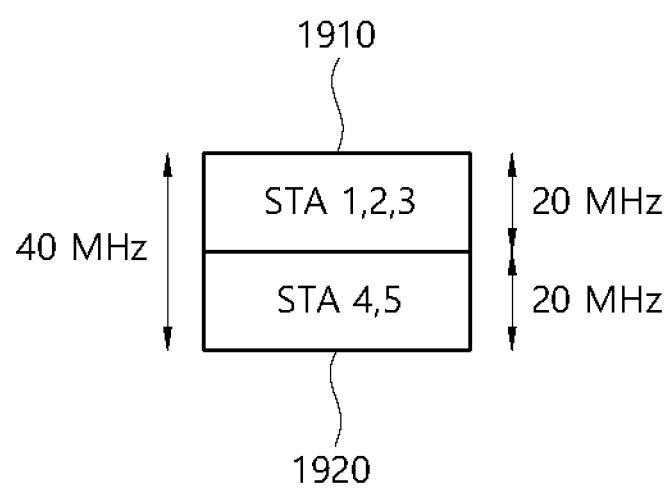
FIG. 19 is a diagram describing C-OFDMA.

FIG. 19 is a diagram describing C-OFDMA.

Coordinated-OFDMA (C-OFDMA) is an extension of 11ax OFDMA from a single BSS to a multi-BSS scenario. Additionally, C-OFDMA efficiently uses (or utilizes) frequency resources throughout the entire network. In addition, C-OFDMA enhances efficiency when BSS traffic does not fully utilize resources.

Referring to FIG. 19, a spectrum (1910) used for transmission of BSS1 and a spectrum (1920) used for transmission of BSS2 each exists in a 20 MHz band in a total band of 40 MHz. Synchronized transmission may be performed in order to obtain orthogonality. STA 1 to STA 3 are allocated to the spectrum (1910) used for transmission of BSS1, and STA 4 and STA 5 are allocated to the spectrum (1920) used for transmission of BSS2.

Figure 20:
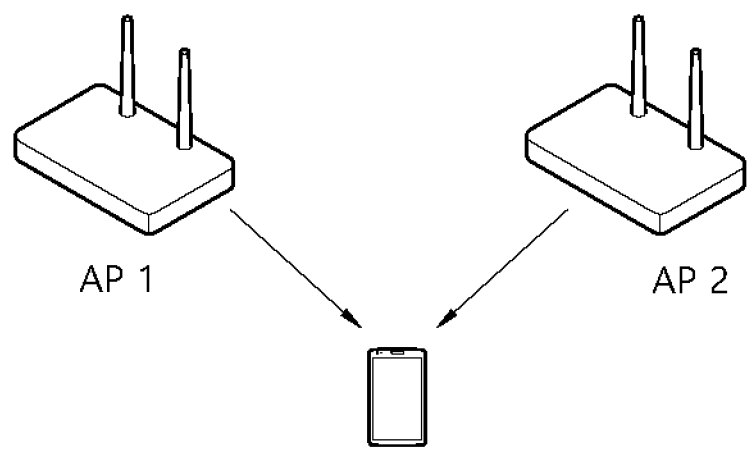
FIG. 20 shows an example of joint transmission.

FIG. 20 shows an example of joint transmission.

Joint transmission means performing joint beamforming to a single STA (J-Tx). Referring to FIG. 20, one STA is receiving services from AP1 and AP2.

Since joint transmission may have stricter synchronization requirements, joint transmission shall be considered separately. Joint transmission may be performed more easily than joint processing transmission for multiple STAs. However, joint transmission may misuse (or exploit) beamforming and power gain from multiple APs.

Figure 21:
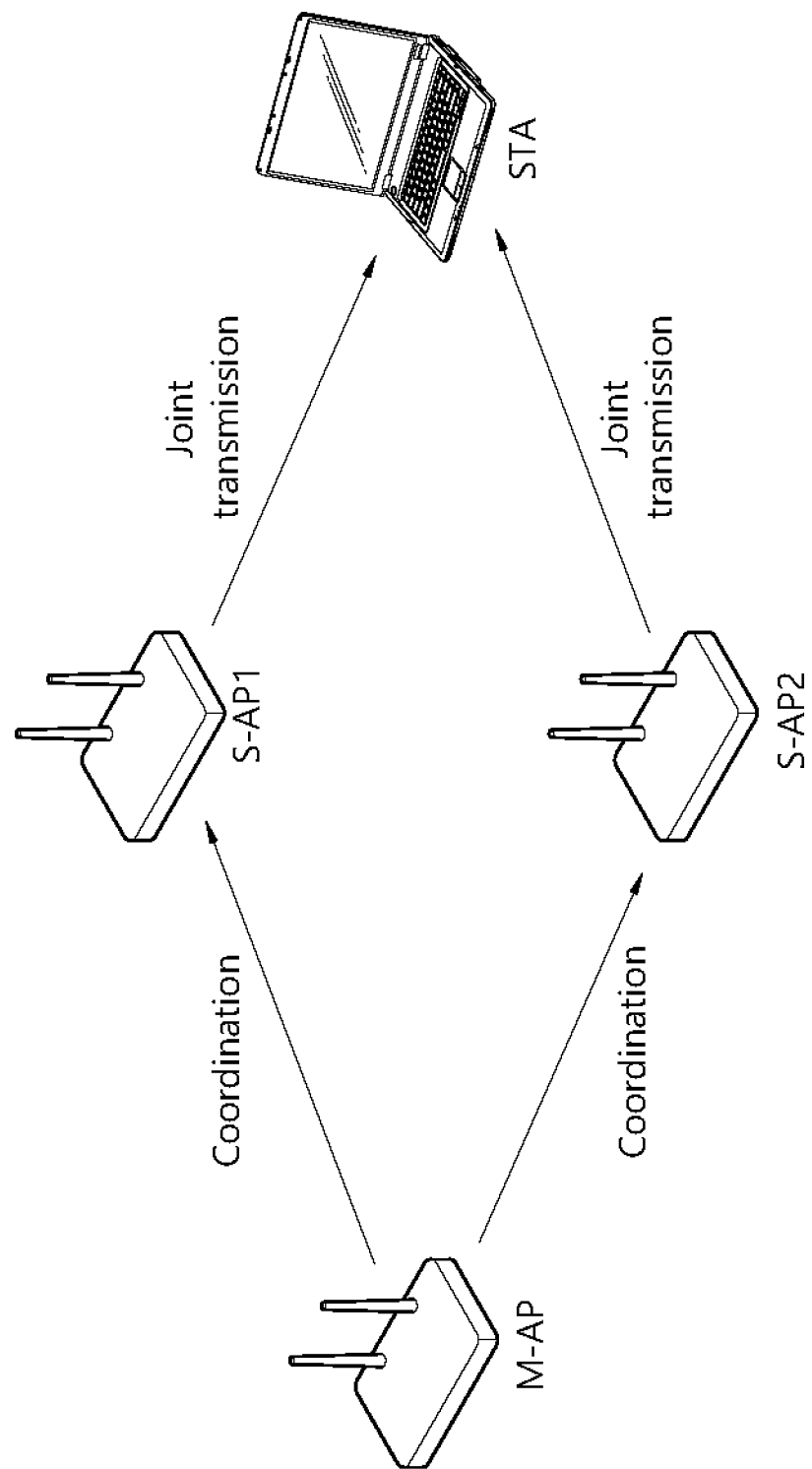
FIG. 21 shows an example of performing joint transmission through an M-AP and S-APs.

FIG. 21 shows an example of performing joint transmission through an M-AP and S-APs.

The Master AP (M-AP) performs the role of an AP coordinator. The Slave AP (S-AP) participates in joint transmission, which is coordinated by the M-AP. Referring to FIG. 21, S-AP1 has the function of an STA in a coordination step (or phase) and has the function of an AP in a transmission step (or phase).

6. Proposed Embodiment: NAV Protection for Multi-AP Coordination

<Issues and Problems>

In comparison with the previous WLAN frame transmission (i.e., a case where one AP transmits a PPDU to one or more STAs or where one or more STAs transmit(s) a PPDU to one AP), in multi-AP coordinated transmission, multiple APs simultaneously transmit a frame to one or more STAs. Frames that are transmitted by the multiple APs shall be protected while avoiding interference of OBSS STAs or STAs existing within a transmission coverage of the multiple APs.

C-BF, C-OFDMA, and joint transmission (J-Tx) may be beamformed for one or more target receivers, and these cannot be received by closely located STAs. OBSS or unintended STAs for beamforming transmission may interfere with C-BF/C-OFDMA/J-Tx, without detecting any beamforming transmission that is in process.

All 1 lay STAs transmit frames by using beamforming so as to avoid obstructing other transmission that are in process as much as possible. Additionally, before performing beamforming transmission, all 11ay STAs may detect a carrier by using the direction of a beam.

<Possible Solutions>

NAV protection for C-BF/C-OFDMA/J-Tx is needed.

1) RTS/CTS and CTS-Self Cannot be a Solution.

In case multiple S-APs simultaneously perform transmission, RTS and CTS-self may be in conflict (or collide). When the AP coordinator transmits a CTS-self, the C-OFDMA/J-Tx may not be protected within a range between the S-APs and the STA.

2) Coordinated RTS (C-RTS) and CTS Exchange by M-AP and S-AP(s) (a Case where a Wireless Backhaul is Connected Between the M-AP and the S-AP(s))

In case of MU-RTS/CTS of the conventional 11ax, although one AP transmitting a MU-RTS frame to multiple STAs and receiving a CTS frame from multiple STAs is similar to one AP transmitting a C-RTS frame to multiple STAs and receiving a CTS frame from multiple STAs, since the procedures that are performed afterwards are different, a protection method other than the conventional MU-RTS/CTS method is needed. In case of the conventional MU-RTS/CTS method, after transmitting an MU-RTS frame and receiving a CTS frame from multiple STAs, the corresponding AP triggers a UL MU transmission through a DL MU PPDU transmission and a Trigger frame transmission. Conversely, in case of the newly defined C-RTS/CTS method, after exchanging C-RTS/CTS frames, C-BF frame transmission of an S-AP, which has transmitted the CTS frame, is performed instead of that of the M-AP, which has transmitted the C-RTS frame.

Moreover, the C-RTS frame may be defined as a frame initiating C-BF transmission. And, accordingly, this may be used as a method for aligning transmission time synchronization between S-APs transmitting C-BF frames, after performing C-RTS/CTS exchange.

Figure 22:
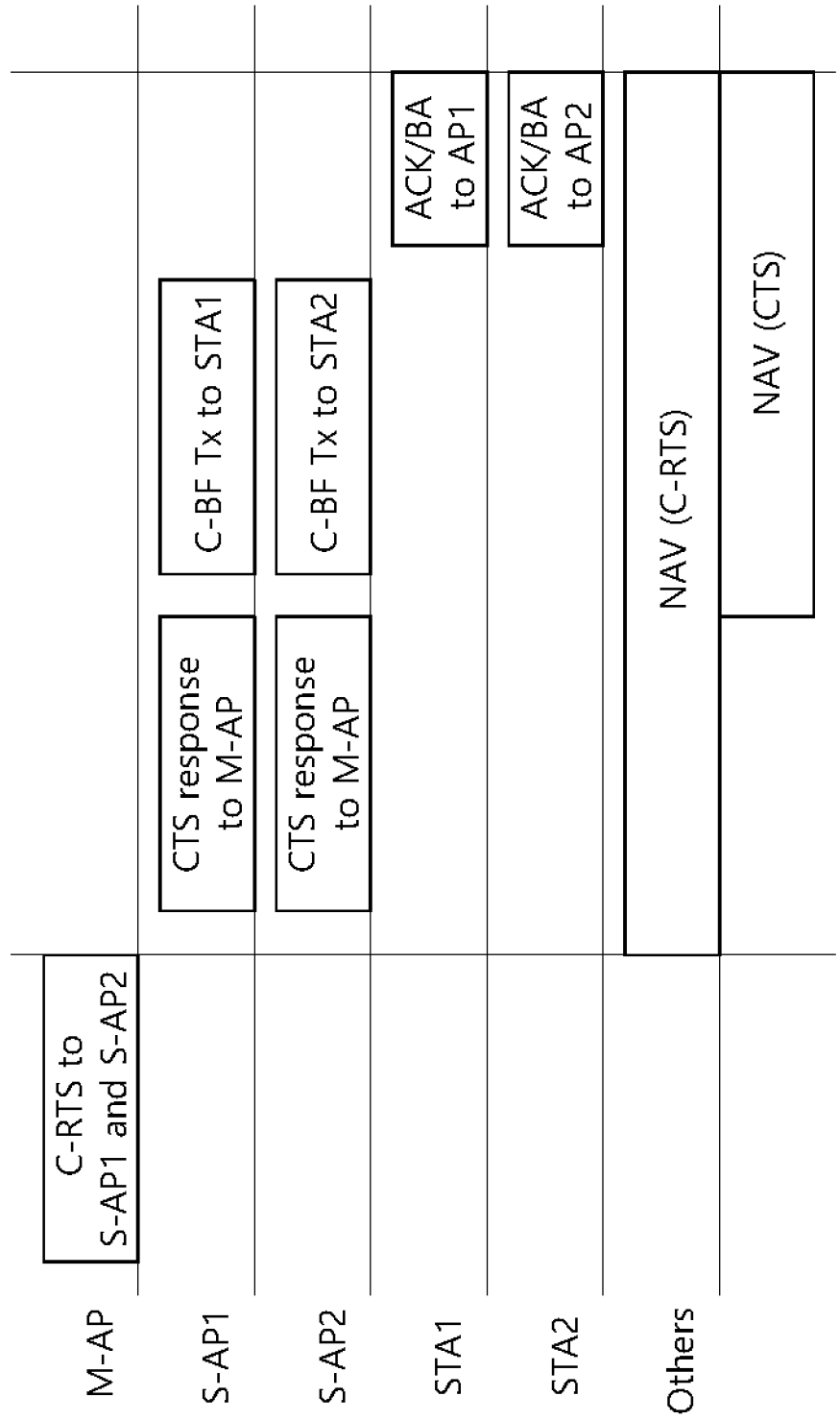
FIG. 22 shows an example of performing NAV protection for multi-AP coordination by using C-RTS.

FIG. 22 shows an example of performing NAV protection for multi-AP coordination by using C-RTS.

Referring to FIG. 22, the M-AP transmits a C-RTS trigger frame to the S-AP, and the S-AP responds with a CTS frame. The S-AP configures the same value for a TXVECTOR parameter SCRAMBLER_INITIAL_VALUE (e.g., RXVECTOR parameter SCRAMBLER_INITIAL_VALUE of a PPDU delivering the C-RTS frame) and then transmits the CTS frame. After the CTS frame is transmitted to the M-AP by the S-AP, the S-AP transmits a C-BF/C-OFDMA/J-Tx frame to one or more target STAs. At this point, the C-RTS may be referred to as another type of control frame, such as a Multi-AP (MAP) trigger frame or a Slave trigger frame, and so on.

3) An Unsolicited CTS Frame Transmitted by an S-AP (a Case where a Wired Backhaul is Connected Between the M-AP and the S-AP(s))

Figure 23:
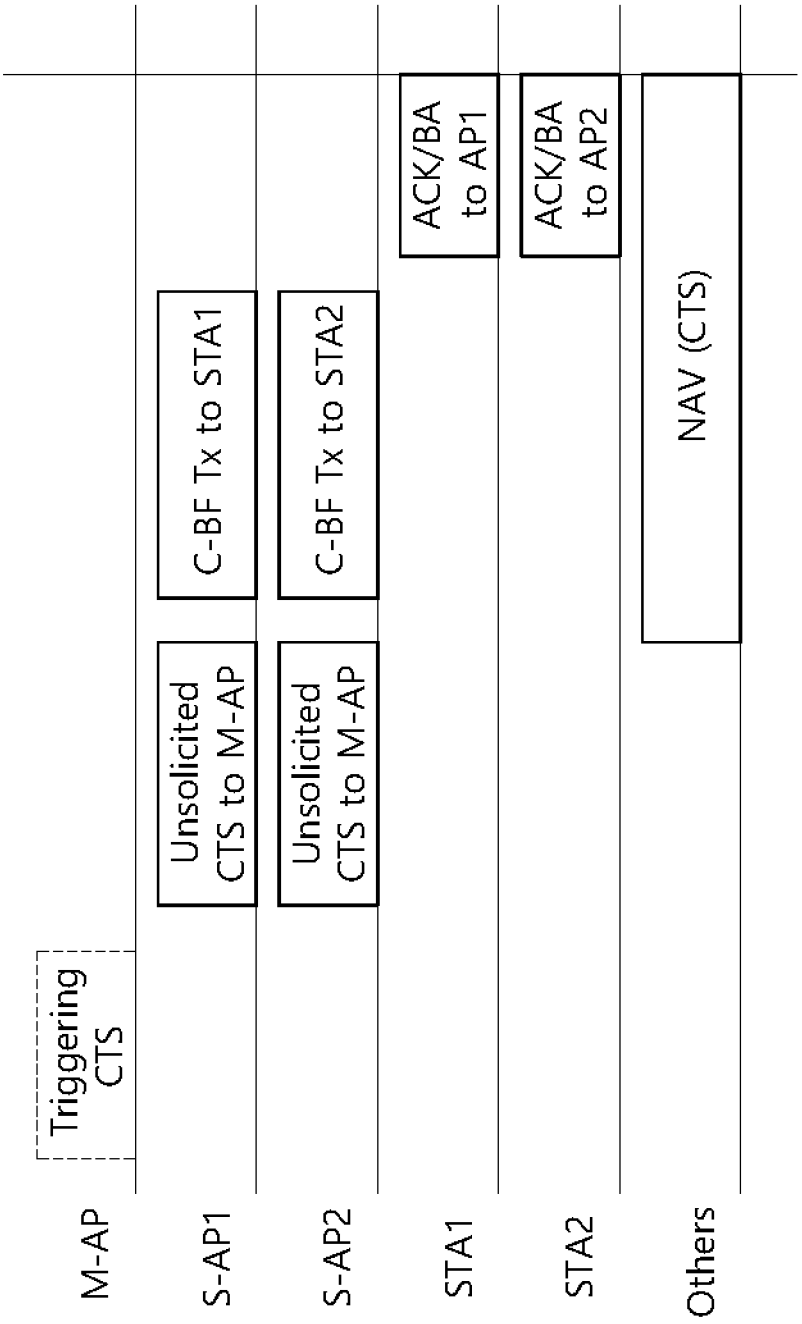
FIG. 23 shows an example of performing NAV protection for multi-AP coordination by using an unsolicited CTS.

FIG. 23 shows an example of performing NAV protection for multi-AP coordination by using an unsolicited CTS.

Referring to FIG. 23, the S-AP transmits a CTS frame having an RA field, which is configured as a M-AP address or a pre-defined value (the same value being configured to an RA field of a CTS frame, which is transmitted by multiple S-APs). The S-AP configures the same value for a TXVECTOR parameter SCRAMBLER_INITIAL_VALUE and then transmits the CTS frame. The CTS frame may be triggered by the M-AP by using wired backhaul signaling between the M-AP and the S-AP. However, this deviates from the range of the IEEE 802.11 standard. After transmitting the CTS frame, the S-AP transmits a C-BF/C-OFDMA/J-Tx frame to one or more target STAs.

4) Protection Using the PHY Header

Figure 24:
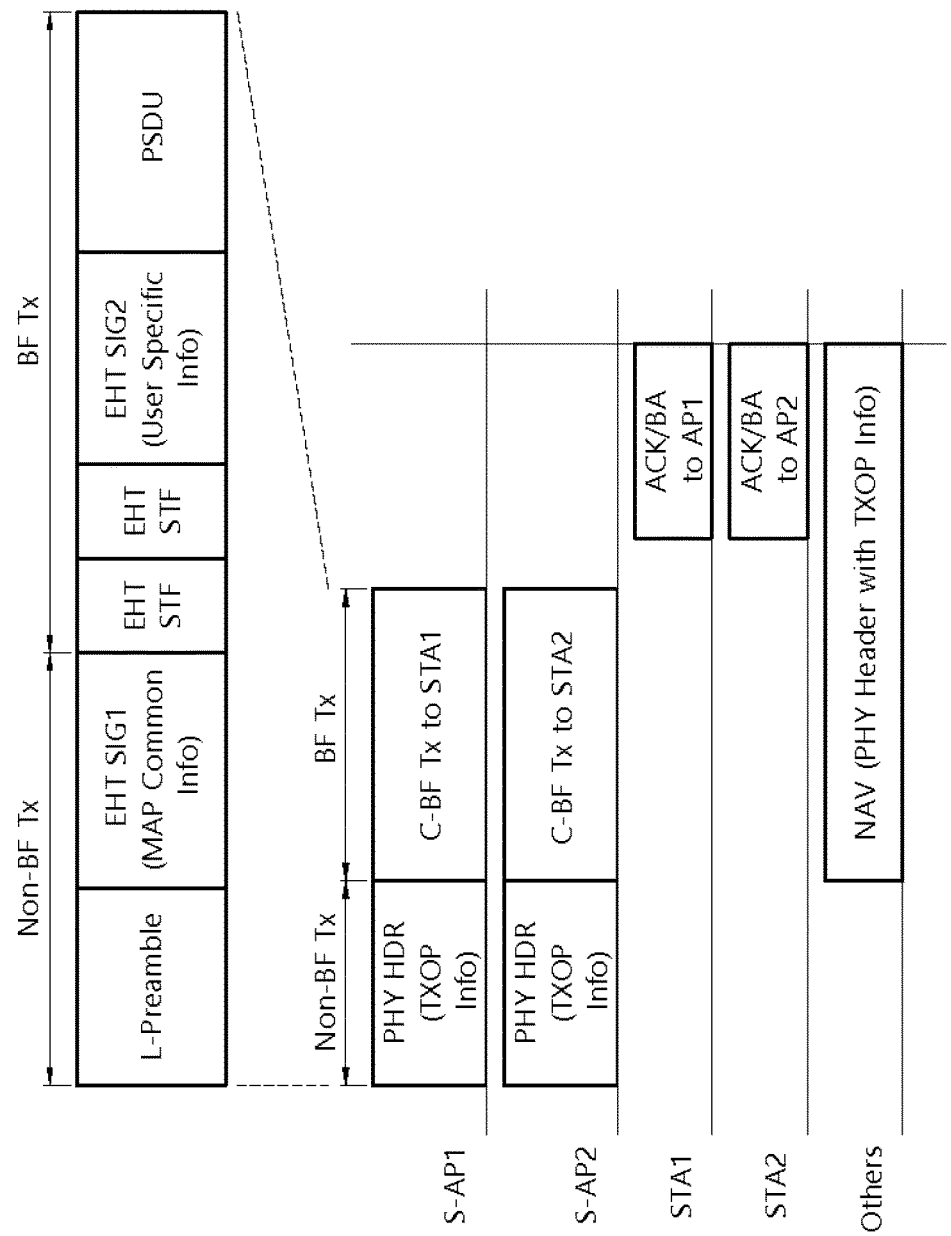
FIG. 24 shows an example of performing NAV protection for multi-AP coordination by using a PHY header.

FIG. 24 shows an example of performing NAV protection for multi-AP coordination by using a PHY header.

Referring to FIG. 24, an EHT PHY header may include TXOP protection information, such as TXOP_DURATION of HE-SIG-A. In order to protect the beamformed PPDU transmission, part of the TXOP protection information within the PPDU shall be transmitted by using non-beamforming transmission (Omni directional transmission), so that an OBSS STA and an unintended STA can receive the corresponding information and configure a NAV based on the TXOP information.

However, since the C-BF/C-OFDMA/J-Tx is performed by multiple APs, the multiple APs transmit frame simultaneously. In order for the frames to be successfully decoded by the OBSS STA and the unintended STA, a non-beamforming part of the PPDU, such as non-HT, and the SIG-A part of the PPDU shall be configured to have the same value within the C-BF/C-OFDMA/J-Tx.

The non-beamforming part of the PPDU may include Multi-AP common information (MAP common info), such as a multi-AP BSS color, a TXOP Duration, a PPDU type, a PPDU BW, MIMO information, and so on.

The beamforming part of the PPDU may include user specific information (User Specific info), such as PSDU decoding information (e.g., STA ID, MCS, MIMO information, RU information).

Hereinafter, the embodiment according to the present specification will be described in detail with reference to FIG. 13 to FIG. 24.

Figure 25:
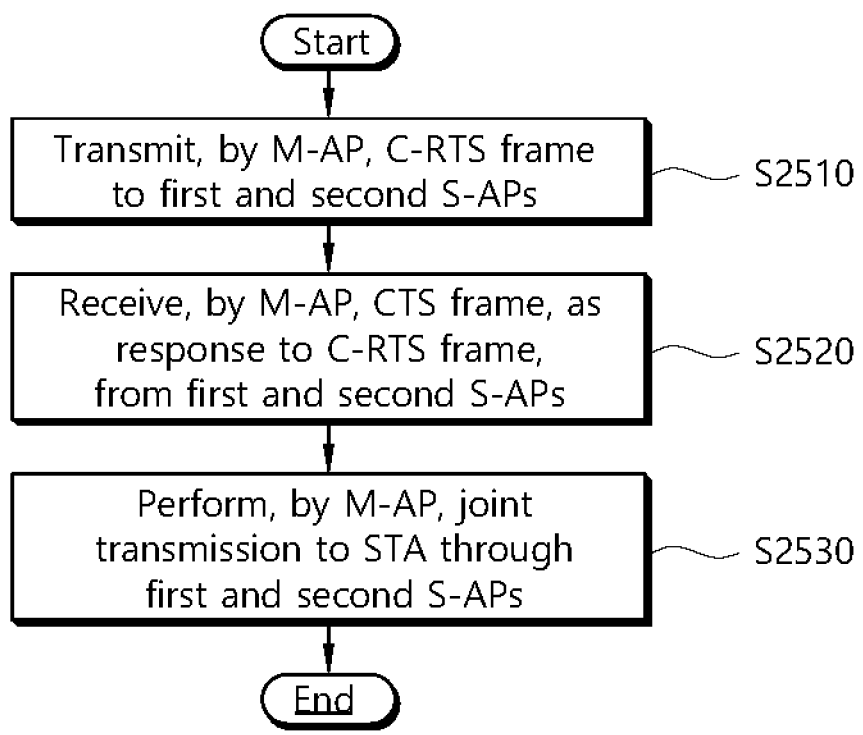
FIG. 25 is a flow chart showing a procedure of transmitting a joint frame, by an AP, according to an embodiment of the present specification.

FIG. 25 is a flow chart showing a procedure of transmitting a joint frame, by an AP, according to an embodiment of the present specification.

An example of FIG. 25 may be performed in a network environment being supported by a next generation wireless LAN system. The next generation wireless LAN system is an enhanced (or evolved) version of the 802.11ax system, which can satisfy backward compatibility with the 802.11ax system.

The example of FIG. 25 is performed by a Master-Access Point (M-AP) supporting multiple APs. A receiving device of the present embodiment may correspond to a station (STA) supporting an Extremely High Throughput (EHT) WLAN system.

In step S2510, a Master-Access Point (M-AP) transmits a Coordinated-Request To Send (C-RTS) frame to a first Slave-Access Point (S-AP) and a second S-AP.

In step S2520, the M-AP receives a Clear To Send (CTS) frame, as a response to the C-RTS frame, from the first S-AP and the second S-AP.

In step S2530, the M-AP performs the joint transmission to the station (STA) through the first S-AP and the second S-AP.

The M-AP performs a role of a coordinator coordinating multiple APs (herein, the first S-AP and the second S-AP). Multi-AP coordination may be performed through C-RTS frame and CTS-frame exchange between the M-AP and the first and second S-APs.

The C-RTS frame performs a role of a trigger frame and may be referred to as a Multi-AP (MAP) trigger frame or a Slave trigger frame.

A TXVECTOR parameter SCRAMBLER_INITIAL_VALUE of the CTS frame may be configured to be equal to a RXVECTOR parameter SCRAMBLER_INITIAL_VALUE of the C-RTS frame.

A step of performing, by the M-AP, the joint transmission to the STA through the first and second S-APs may include the following process.

The first S-AP may transmit a first Coordinated-Beamforming (C-BF) frame to the STA. The second S-AP may transmit a second Coordinated-Beamforming (C-BF) frame to the STA.

The first S-AP may receive a first ACK or first Block ACK (BA) on the first C-BF frame. The second S-AP may receive a second ACK or second BA on the second C-BF frame.

The first and second C-BR frames may be transmitted simultaneously. That is, joint transmission may be performed through the first and second C-BR frames. The first and second C-BR frames are frames being transmitted by multiple APs being coordinated and transmitted based on beamforming. The first and second C-BR frames may be replaced with C-OFDMA frames or joint frames, and so on. The C-OFDMA frame is a frame being transmitted by multiple APs being coordinated and transmitted based on OFDMA.

The first and second ACKs may be received simultaneously, and the first and second BAs may be received simultaneously.

A Network Allocation Vector (NAV) may be configured from a first time point to a second time point based on the C-RTS frame. Additionally, a NAV may be configured from a third time point to a fourth time point based on the CTS frame.

The first time point may be a time point at which transmission of the C-RTS frame is ended, and the second time point may be a time point at which transmission of the first ACK or the first BA is ended. The third time point may be a time point at which transmission of the CTS frame is ended, and the fourth time point may be a time point at which transmission of the second ACK or the second BA is ended.

In case the STA includes a first STA and a second STA, the first C-BF frame may be transmitted to the first STA, the second C-BF frame may be transmitted to the second STA, the first ACK or the first BA may be transmitted by the first STA, and the second ACK or the second BA may be transmitted by the second STA.

The M-AP and the first and second S-APs may be connected through a wireless backhaul.

As another example, the M-AP and the first and second S-APs may be connected through a wired backhaul.

At this point, the first and second S-APs may transmit an unsolicited CTS frame to the M-AP. Therefore, the M-AP does not need to transmit a triggering CTS frame that requests or triggers an unsolicited CTS frame.

A NAV may be configured after having transmitted the unsolicited CTS frame.

After the first and second S-APs have transmitted the CTS frames, the first and second S-APs may transmit a C-BF frame/C-OFDMA frame/joint transmission frame to the STA (joint transmission). The STA may then transmit an ACK or BA for the C-BF frame/C-OFDMA frame/joint transmission frame to the first and second S-APs.

As yet another example, a case where the first and second S-APs transmit a PPDU including a PHY header to the STA may be described.

The PPDU may be configured of a non-beamforming part and a beamforming part. Herein, the non-beamforming part includes a legacy preamble and an EHT-SIG1 field. The EHT-SIG1 field includes a Multi-AP (MAP) common information. The beamforming part includes EHT-STF, EHT-LTF, EHT-SIG2 fields and a PSDU. The EHT-SIG2 field includes user specific information (or User Specific Info).

The non-beamforming part may correspond to a PHY header, and the PHY header includes TXOP information. Accordingly, an AP may configure a NAV after having transmitted the PHY header based on the TXOP information, which is included in the PHY header.

The first and second S-APs may transmit the C-BF frame/C-OFDMA frame/joint transmission frame by including the corresponding frame(s) in the beamforming part (joint transmission). The STA may then transmit an ACK or BA for the C-BF frame/C-OFDMA frame/joint transmission frame to the first and second S-APs.

Figure 26:
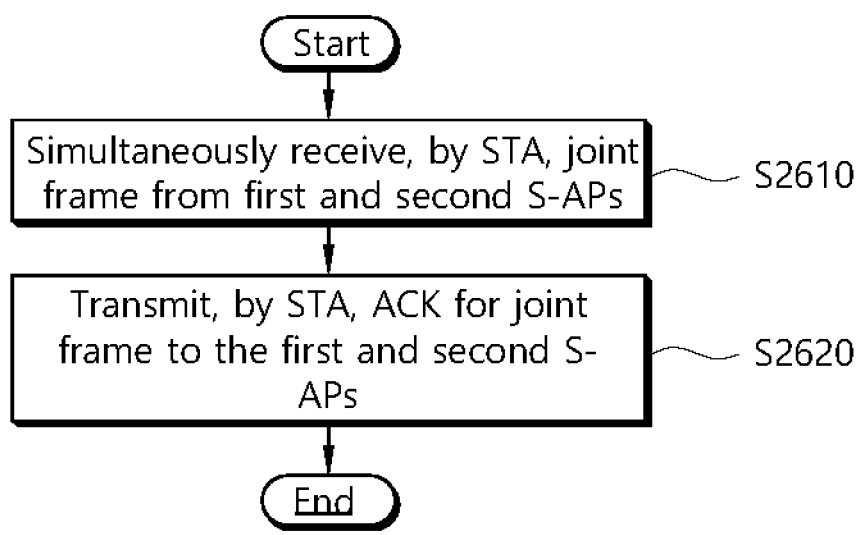
FIG. 26 is a flow chart showing a procedure of receiving a joint frame, by an STA, according to an embodiment of the present specification.

FIG. 26 is a flow chart showing a procedure of receiving a joint frame, by an STA, according to an embodiment of the present specification.

An example of FIG. 26 may be performed in a network environment being supported by a next generation wireless LAN system. The next generation wireless LAN system is an enhanced (or evolved) version of the 802.11ax system, which can satisfy backward compatibility with the 802.11ax system.

The example of FIG. 26 is performed by a station (STA), which supports multiple APs and supports an Extremely High Throughput (EHT) WLAN system. The transmitting device of FIG. 26 may correspond to a Master-AP (M-AP) or Slave-AP (S-AP) that supports multiple APs.

In step S2610, the station (STA) simultaneously receives a joint frame from first and second Slave-Access Points (S-APs).

In step S2620, the STA transmits an ACK or Block ACK (BA) for the joint frame to the first and second S-APs.

The first and second S-APs exchange a Coordinated-Request To Send (C-RTS) frame and a Clear To Send (CTS) frame to the Master-Access Point (M-AP). The CTS frame is a response to the C-RTS frame.

The M-AP performs a role of a coordinator coordinating multiple APs (herein, the first S-AP and the second S-AP). Multi-AP coordination may be performed through C-RTS frame and CTS-frame exchange between the M-AP and the first and second S-APs.

The C-RTS frame performs a role of a trigger frame and may be referred to as a Multi-AP (MAP) trigger frame or a Slave trigger frame.

A TXVECTOR parameter SCRAMBLER_INITIAL_VALUE of the CTS frame may be configured to be equal to a RXVECTOR parameter SCRAMBLER_INITIAL_VALUE of the C-RTS frame.

A step of simultaneously receiving, by the STA, a joint transmission from the first and second S-APs may include the following process.

The first S-AP may transmit a first Coordinated-Beamforming (C-BF) frame to the STA. The second S-AP may transmit a second Coordinated-Beamforming (C-BF) frame to the STA.

The first S-AP may receive a first ACK or first Block ACK (BA) on the first C-BF frame. The second S-AP may receive a second ACK or second BA on the second C-BF frame.

The first and second C-BR frames may be transmitted simultaneously. That is, joint transmission may be performed through the first and second C-BR frames. The first and second C-BR frames are frames being transmitted by multiple APs being coordinated and transmitted based on beamforming. The first and second C-BR frames may be replaced with C-OFDMA frames or joint frames, and so on. The C-OFDMA frame is a frame being transmitted by multiple APs being coordinated and transmitted based on OFDMA.

The first and second ACKs may be received simultaneously, and the first and second BAs may be received simultaneously.

A Network Allocation Vector (NAV) may be configured from a first time point to a second time point based on the C-RTS frame. Additionally, a NAV may be configured from a third time point to a fourth time point based on the CTS frame.

The first time point may be a time point at which transmission of the C-RTS frame is ended, and the second time point may be a time point at which transmission of the first ACK or the first BA is ended. The third time point may be a time point at which transmission of the CTS frame is ended, and the fourth time point may be a time point at which transmission of the second ACK or the second BA is ended.

In case the STA includes a first STA and a second STA, the first C-BF frame may be transmitted to the first STA, the second C-BF frame may be transmitted to the second STA, the first ACK or the first BA may be transmitted by the first STA, and the second ACK or the second BA may be transmitted by the second STA.

The M-AP and the first and second S-APs may be connected through a wireless backhaul.

As another example, the M-AP and the first and second S-APs may be connected through a wired backhaul.

At this point, the first and second S-APs may transmit an unsolicited CTS frame to the M-AP. Therefore, the M-AP does not need to transmit a triggering CTS frame that requests or triggers an unsolicited CTS frame.

A NAV may be configured after having transmitted the unsolicited CTS frame.

After the first and second S-APs have transmitted the CTS frames, the first and second S-APs may transmit a C-BF frame/C-OFDMA frame/joint transmission frame to the STA (joint transmission). The STA may then transmit an ACK or BA for the C-BF frame/C-OFDMA frame/joint transmission frame to the first and second S-APs.

As yet another example, a case where the first and second S-APs transmit a PPDU including a PHY header to the STA may be described.

The PPDU may be configured of a non-beamforming part and a beamforming part. Herein, the non-beamforming part includes a legacy preamble and an EHT-SIG1 field. The EHT-SIG1 field includes a Multi-AP (MAP) common information. The beamforming part includes EHT-STF, EHT-LTF, EHT-SIG2 fields and a PSDU. The EHT-SIG2 field includes user specific information (or User Specific Info).

The non-beamforming part may correspond to a PHY header, and the PHY header includes TXOP information. Accordingly, an AP may configure a NAV after having transmitted the PHY header based on the TXOP information, which is included in the PHY header.

The first and second S-APs may transmit the C-BF frame/C-OFDMA frame/joint transmission frame by including the corresponding frame(s) in the beamforming part (joint transmission). The STA may then transmit an ACK or BA for the C-BF frame/C-OFDMA frame/joint transmission frame to the first and second S-APs.

7. Device Configuration

Figure 27:
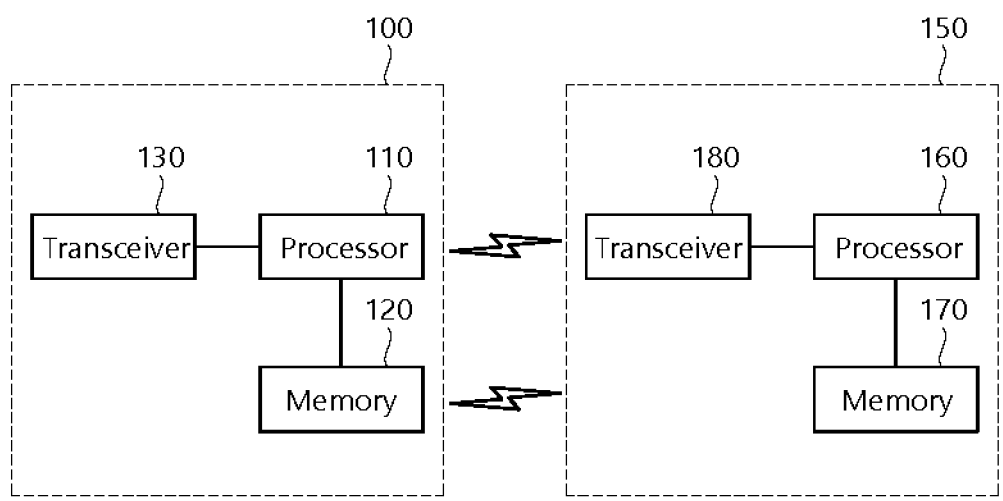
FIG. 27 is a diagram for describing a device for implementing the above-described method.

FIG. 27 is a diagram for describing a device for implementing the above-described method.

A wireless device (100) of FIG. 27 is a transmitting device that can implement the above-described embodiment and may be operated as an AP STA. A wireless device (150) of FIG. 27 is a receiving device that can implement the above-described embodiment and may be operated as a non-AP STA.

The transmitting device (100) may include a processor (110), a memory (120), and a transmitting/receiving unit (130), and the receiving device (150) may include a processor (160), a memory (170), and a transmitting/receiving unit (180). The transmitting/receiving unit (130, 180) transmits/receives a radio signal and may be operated in a physical layer of IEEE 802.11/3GPP, and so on. The processor (110, 160) may be operated in the physical layer and/or MAC layer and may be operatively connected to the transmitting/receiving unit (130, 180).

The processor (110, 160) and/or the transmitting/receiving unit (130, 180) may include application-specific integrated circuit (ASIC), other chipset, logic circuit and/or data processor. The memory (120, 170) may include read-only memory (ROM), random access memory (RAM), flash memory, memory card, storage medium and/or other storage unit. When the embodiments are executed by software, the techniques (or methods) described herein can be executed with modules (e.g., processes, functions, and so on) that perform the functions described herein. The modules can be stored in the memory (120, 170) and executed by the processor (110, 160). The memory (120, 170) can be implemented (or positioned) within the processor (110, 160) or external to the processor (110, 160). Also, the memory (120, 170) may be operatively connected to the processor (110, 160) via various means known in the art.

The processor (110, 160) may implement the functions, processes and/or methods proposed in the present disclosure. For example, the processor (110, 160) may perform the operation according to the present embodiment.

Operations of a processor (110) of the transmitting device will be described in detail as follows. The processor (110) of the transmitting device transmits a C-RTS frame to first and second S-APs, receives a CTS frame, which is a response to the C-RTS frame, and performs joint transmission to the STA through the first and second S-APs.

Operations of a processor (160) of the receiving device will be described in detail as follows. The processor (160) of the receiving device simultaneously receives a joint frame from the first and second S-APs, and transmits an ACK or BA for the joint frame to the first and second S-APs.

FIG. 28 shows a more detailed wireless device (or apparatus) implementing an embodiment according to the present specification. The present specification describing the transmitting device or receiving device, as described above, may be applied to this embodiment.

A wireless device includes a processor (610), a power management module (611), a battery (612), a display (613), a keypad (614), a subscriber identification module (SIM) card (615), a memory (620), a transceiver (630), one or more antennas (631), a speaker (640), and a microphone (641).

The processor (610) may be configured to implement proposed functions, procedures and/or methods of the present disclosure described below. The processor (610) may be configured to control one or more other components of the UE (600) to implement proposed functions, procedures and/or methods of the present disclosure described below. Layers of the radio interface protocol may be implemented in the processor (610). The processor (610) may include application-specific integrated circuit (ASIC), other chipset, logic circuit and/or data processing device. The processor (610) may be an application processor (AP). The processor (610) may include at least one of a digital signal processor (DSP), a central processing unit (CPU), a graphics processing unit (GPU), a modem (modulator and demodulator). An example of the processor (610) may be found in SNAPDRAGON™ series of processors made by Qualcomm®, EXYNOS™ series of processors made by Samsung®, a series of processors made by Apple®, HELIO™ series of processors made by MediaTek®, ATOM™ series of processors made by Intel® or a corresponding next generation processor.

The power management module (611) manages power for the processor (610) and/or the transceiver (630). The battery (612) supplies power to the power management module (611). The display (613) outputs results processed by the processor (610). The keypad (614) receives inputs to be used by the processor (610). The keypad (614) may be shown on the display (613). The SIM card (615) is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory (620) is operatively coupled with the processor (610) and stores a variety of information to operate the processor (610). The memory (620) may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory (620) and executed by the processor (610). The memory (620) can be implemented within the processor (610) or external to the processor (610) in which case those can be communicatively coupled to the processor (610) via various means as is known in the art.

The transceiver (630) is operatively coupled with the processor (610), and transmits and/or receives a radio signal. The transceiver (630) includes a transmitter and a receiver. The transceiver (630) may include baseband circuitry to process radio frequency signals. The transceiver (630) controls the one or more antennas (631) to transmit and/or receive a radio signal.

The speaker (640) outputs sound-related results processed by the processor (610). The microphone (641) receives sound-related inputs to be used by the processor (610).

In case of a transmitting device, the processor (610) transmits a C-RTS frame to first and second S-APs, receives a CTS frame, which is a response to the C-RTS frame, and performs joint transmission to the STA through the first and second S-APs.

In case of a receiving device, the processor (610) simultaneously receives a joint frame from the first and second S-APs, and transmits an ACK or BA for the joint frame to the first and second S-APs.

The M-AP performs a role of a coordinator coordinating multiple APs (herein, the first S-AP and the second S-AP). Multi-AP coordination may be performed through C-RTS frame and CTS-frame exchange between the M-AP and the first and second S-APs.

The C-RTS frame performs a role of a trigger frame and may be referred to as a Multi-AP (MAP) trigger frame or a Slave trigger frame.

A TXVECTOR parameter SCRAMBLER_INITIAL_VALUE of the CTS frame may be configured to be equal to a RXVECTOR parameter SCRAMBLER_INITIAL_VALUE of the C-RTS frame.

A step of performing, by the M-AP, the joint transmission to the STA through the first and second S-APs may include the following process.

The first S-AP may transmit a first Coordinated-Beamforming (C-BF) frame to the STA. The second S-AP may transmit a second Coordinated-Beamforming (C-BF) frame to the STA.

The first S-AP may receive a first ACK or first Block ACK (BA) on the first C-BF frame. The second S-AP may receive a second ACK or second BA on the second C-BF frame.

The first and second C-BR frames may be transmitted simultaneously. That is, joint transmission may be performed through the first and second C-BR frames. The first and second C-BR frames are frames being transmitted by multiple APs being coordinated and transmitted based on beamforming. The first and second C-BR frames may be replaced with C-OFDMA frames or joint frames, and so on. The C-OFDMA frame is a frame being transmitted by multiple APs being coordinated and transmitted based on OFDMA.

The first and second ACKs may be received simultaneously, and the first and second BAs may be received simultaneously.

A Network Allocation Vector (NAV) may be configured from a first time point to a second time point based on the C-RTS frame. Additionally, a NAV may be configured from a third time point to a fourth time point based on the CTS frame.

The first time point may be a time point at which transmission of the C-RTS frame is ended, and the second time point may be a time point at which transmission of the first ACK or the first BA is ended. The third time point may be a time point at which transmission of the CTS frame is ended, and the fourth time point may be a time point at which transmission of the second ACK or the second BA is ended.

In case the STA includes a first STA and a second STA, the first C-BF frame may be transmitted to the first STA, the second C-BF frame may be transmitted to the second STA, the first ACK or the first BA may be transmitted by the first STA, and the second ACK or the second BA may be transmitted by the second STA.

The M-AP and the first and second S-APs may be connected through a wireless backhaul.

As another example, the M-AP and the first and second S-APs may be connected through a wired backhaul.

At this point, the first and second S-APs may transmit an unsolicited CTS frame to the M-AP. Therefore, the M-AP does not need to transmit a triggering CTS frame that requests or triggers an unsolicited CTS frame.

A NAV may be configured after having transmitted the unsolicited CTS frame.

After the first and second S-APs have transmitted the CTS frames, the first and second S-APs may transmit a C-BF frame/C-OFDMA frame/joint transmission frame to the STA (joint transmission). The STA may then transmit an ACK or BA for the C-BF frame/C-OFDMA frame/joint transmission frame to the first and second S-APs.

As yet another example, a case where the first and second S-APs transmit a PPDU including a PHY header to the STA may be described.

The PPDU may be configured of a non-beamforming part and a beamforming part. Herein, the non-beamforming part includes a legacy preamble and an EHT-SIG1 field. The EHT-SIG1 field includes a Multi-AP (MAP) common information. The beamforming part includes EHT-STF, EHT-LTF, EHT-SIG2 fields and a PSDU. The EHT-SIG2 field includes user specific information (or User Specific Info).

The non-beamforming part may correspond to a PHY header, and the PHY header includes TXOP information. Accordingly, an AP may configure a NAV after having transmitted the PHY header based on the TXOP information, which is included in the PHY header.

The first and second S-APs may transmit the C-BF frame/C-OFDMA frame/joint transmission frame by including the corresponding frame(s) in the beamforming part (joint transmission). The STA may then transmit an ACK or BA for the C-BF frame/C-OFDMA frame/joint transmission frame to the first and second S-APs.

What is claimed is:

1. A method for performing joint transmission in a wireless LAN system, the method comprising:
    transmitting, by a Master-Access Point (M-AP), a Coordinated-Request To Send (C-RTS) frame to a first Slave-Access Point (S-AP) and a second S-AP;
    receiving, by the M-AP, a Clear To Send (CTS) frame, as a response to the C-RTS frame, to the first and second S-APs; and
    performing, by the M-AP, the joint transmission to a station (STA) through the first and second S-APs,
    wherein a TXVECTOR parameter SCRAMBLER_INITIAL_VALUE of the CTS frame is configured to be equal to a RXVECTOR parameter SCRAMBLER_INITIAL_VALUE of the C-RTS frame.

2. The method of claim 1, wherein the step of performing, by the M-AP, the joint transmission to an STA through the first and second S-APs comprises:
    transmitting, by the first S-AP, a first Coordinated-Beamforming (C-BF) frame to the STA;
    transmitting, by the second S-AP, a second Coordinated-Beamforming (C-BF) frame to the STA;
    receiving, by the first S-AP, a first ACK or first Block ACK (BA) on the first C-BF frame; and
    receiving, by the second S-AP, a second ACK or second BA on the second C-BF frame,
    wherein the first and second C-BR frames are transmitted simultaneously,
    wherein the first and second ACKs are received simultaneously, and
    wherein the first and second BAs are received simultaneously.

3. The method of claim 2,
    wherein a Network Allocation Vector (NAV) is configured from a first time point to a second time point based on the C-RTS frame, and
    wherein a NAV is configured from a third time point to a fourth time point based on the CTS frame.

4. The method of claim 3,
    wherein the first time point is a time point at which transmission of the C-RTS frame is ended,
    wherein the second time point is a time point at which transmission of the first ACK or the first BA is ended,
    wherein the third time point is a time point at which transmission of the CTS frame is ended, and
    wherein the fourth time point is a time point at which transmission of the second ACK or the second BA is ended.

5. The method of claim 2, wherein, in case the STA includes a first STA and a second STA,
    the first C-BF frame is transmitted to the first STA,
    the second C-BF frame is transmitted to the second STA,
    the first ACK or the first BA is transmitted by the first STA, and
    the second ACK or the second BA is transmitted by the second STA.

6. The method of claim 1, wherein the M-AP and the first and second S-APs are connected through a wireless backhaul.

7. A wireless device being a Master-Access Point (M-AP) performing joint transmission in a wireless LAN system, the M-AP comprising:
    a memory;
    a transceiver; and
    a processor being operatively connected to the memory and the transceiver,
    wherein the processor is configured to:
    transmit a Coordinated-Request To Send (C-RTS) frame to a first Slave-Access Point (S-AP) and a second S-AP,
    receive a Clear To Send (CTS) frame, as a response to the C-RTS frame, from the first and second S-APs, and
    perform the joint transmission to a station (STA) through the first and second S-APs,
    wherein a TXVECTOR parameter SCRAMBLER_INITIAL_VALUE of the CTS frame is configured to be equal to a RXVECTOR parameter SCRAMBLER_INITIAL_VALUE of the C-RTS frame.

8. The wireless device of claim 7,
    wherein, when the processor performs the joint transmission to the STA through the first and second S-APs, the first S-AP transmits a first Coordinated-Beamforming (C-BF) frame to the STA,
    wherein the second S-AP transmits a second Coordinated-Beamforming (C-BF) frame to the STA,
    wherein the first S-AP receives a first ACK or first Block ACK (BA) on the first C-BF frame,
    wherein the second S-AP receives a second ACK or second BA on the second C-BF frame,
    wherein the first and second C-BR frames are transmitted simultaneously,
    wherein the first and second ACKs are received simultaneously, and
    wherein the first and second BAs are received simultaneously.

9. The wireless device of claim 8,
    wherein a Network Allocation Vector (NAV) is configured from a first time point to a second time point based on the C-RTS frame, and
    wherein a NAV is configured from a third time point to a fourth time point based on the CTS frame.

10. The wireless device of claim 9,
    wherein the first time point is a time point at which transmission of the C-RTS frame is ended,
    wherein the second time point is a time point at which transmission of the first ACK or the first BA is ended,
    wherein the third time point is a time point at which transmission of the CTS frame is ended, and
    wherein the fourth time point is a time point at which transmission of the second ACK or the second BA is ended.

11. The wireless device of claim 8, wherein, in case the STA includes a first STA and a second STA,
    the first C-BF frame is transmitted to the first STA,
    the second C-BF frame is transmitted to the second STA,
    the first ACK or the first BA is transmitted by the first STA, and
    the second ACK or the second BA is transmitted by the second STA.

12. The wireless device of claim 7, wherein the M-AP and the first and second S-APs are connected through a wireless backhaul.

13. A method for receiving a joint frame in a wireless LAN system, the method comprising:
    simultaneously receiving, by a station (STA), a joint frame from first and second Slave-Access Points (S-APs);
    transmitting, by the STA, an ACK or Block ACK (BA) for the joint frame to the first and second S-APs, wherein the first and second S-APs exchange a Coordinated-Request To Send (C-RTS) frame and a Clear To Send (CTS) frame to the Master-Access Point (M-AP), and wherein the CTS frame is a response to the C-RTS frame, wherein a TXVECTOR parameter SCRAMBLER_INITIAL_VALUE of the CTS frame is configured to be equal to a RXVECTOR parameter SCRAMBLER_INITIAL_VALUE of the C-RTS frame.

* * * * *